(12) United States Patent
Stirm et al.

(10) Patent No.: US 7,506,694 B2
(45) Date of Patent: Mar. 24, 2009

(54) ROTARY TOOL

(75) Inventors: Michael Stirm, Oberursel (DE);
Norbert Hahn, Limbach (DE); Martin Lauterwald, Huenstetten (DE); Achim Jung, Hofheim-Marxheim (DE); Stefan D. Gensmann, Frucht (DE); Robert Alan Usselman, Forest Hill, MD (US); Robert Bradus, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/526,578

(22) PCT Filed: Sep. 10, 2003

(86) PCT No.: PCT/EP03/10029
§ 371 (c)(1),
(2), (4) Date: Nov. 17, 2005

(87) PCT Pub. No.: WO2004/024398
PCT Pub. Date: Mar. 25, 2004

(65) Prior Publication Data
US 2006/0124331 A1    Jun. 15, 2006

(30) Foreign Application Priority Data
Sep. 13, 2002 (GB) .................. 0221225.6
Nov. 27, 2002 (GB) .................. 0227584.0

(51) Int. Cl.
*B25F 5/00* (2006.01)
*B25D 16/00* (2006.01)

(52) U.S. Cl. .................. 173/178; 173/48; 173/176; 173/201; 192/56.61; 192/110 R

(58) Field of Classification Search .................. 173/178, 173/48, 104, 109, 201, 176; 81/473, 474, 81/467; 192/56.61, 110 R
See application file for complete search history.

(56) References Cited
U.S. PATENT DOCUMENTS 3,559,784 A * 2/1971 Miller .................. 192/56.43
3,616,883 A * 11/1971 Sindelar .................. 192/56.61
4,732,217 A * 3/1988 Bleicher et al. .................. 173/104
4,776,406 A * 10/1988 Wanner .................. 173/18
4,883,130 A * 11/1989 Dixon .................. 173/178
4,986,369 A * 1/1991 Fushiya et al. .................. 173/178
5,346,023 A * 9/1994 Takagi et al. .................. 173/178
5,738,177 A * 4/1998 Schell et al. .................. 173/178
6,015,017 A * 1/2000 Lauterwald .................. 173/48
6,976,545 B2 * 12/2005 Greitmann .................. 173/104

FOREIGN PATENT DOCUMENTS
GB        1095067        * 12/1967

* cited by examiner

Primary Examiner—Scott A. Smith
(74) Attorney, Agent, or Firm—Kofi Schulterbrandt; Adan Ayala; Scott Markow

(57) ABSTRACT

A hand held motor driven electrically powered tool, in particular a rotary hammer, comprising a spindle (40) for rotatingly driving a tool or bit (68), a spindle rotary drive train (14, 5, 10) for rotatingly driving the spindle (40) and an arrangement for detecting blocking events (16, 17). Blocking events occur when the tool or bit of the tool become rotationally fixed in the material being bored in which case the rotary drive on the spindle from the motor causes the tool housing to rotate in a user's grip. According to a first aspect of the invention an overload clutch (14) is provided in the spindle rotary drive train for transmitting rotary drive to the spindle below a predetermined torque and slipping above the predetermined torque arranged such that the overload clutch cuts off rotary drive to the spindle, for example by reducing the predetermined torque at which the overload clutch (14) slips when a blocking event is detected so as to cut off rotary drive to the spindle in response to a blocking event being detected. According to a second aspect of the invention there is provided a mode change mechanism (45, 47, 49, 43) for selectively disengaging a clutch (10, 7) so as to cut off the rotary drive to the spindle (40) and the clutch is disengaged when a blocking event is detected so as to cut off rotary drive to the spindle in response to a blocking event being detected.

5 Claims, 21 Drawing Sheets

ROTARY TOOL

The present invention relates to a hand held power tool with a rotatingly driven tool or bit, in particular the present invention relates to electrically powered rotary hammering tools.

Rotary hammers will normally have a housing and a hollow cylindrical spindle mounted in the housing. The spindle allows insertion of the shank of a tool or bit, for example a drill bit or a chisel bit, into the front end thereof so that it is retained in the front end of the spindle with a degree of axial movement The spindle may be a single cylindrical part or may be made of two or more co-axial cylindrical parts, which together form the hammer spindle. For example, a front part of the spindle may be formed as a separate tool holder body for retaining the tool or bit.

Such hammers are provided with an impact mechanism which converts the rotational drive from an electric motor to a reciprocating drive for driving a piston, which may be a hollow piston, to reciprocate within the spindle. The piston reciprocatingly drives a ram by means of a closed air cushion located between the piston and the ram. The impacts from the ram are transmitted to the tool or bit of the hammer, optionally via a beatpiece.

Rotary hammers can be employed in combination impact and drilling mode, and also in some cases in a drilling only mode, in which the spindle, or a forwardmost part of the spindle, and hence the bit inserted therein will be caused to rotate. In the combination impact and drilling mode the bit will be caused to rotate at the same time as the bit receives repeated impacts. A rotary drive mechanism transmits rotary drive from the electric motor to the spindle to cause the spindle, or a forwardmost part thereof to rotate.

It is a problem with hand held power tools with a rotating bit that during use of the tool blocking events can sometimes occur, when the bit becomes stuck in the workpiece in such a way that the bit can no longer rotate relative to the workpiece. In this case, the rotary drive to the bit causes the housing of the tool to rotate with respect to the stationary bit. It is known to detect blocking events, for example from U.S. Pat. No. 5,914,882, U.S. Pat. No. 5,584,619, EP771,619 and GB2,086,277 and then once such an event is detected to arrest the rotary drive to the bit. This can be done by braking the motor, which motor provides rotary drive to the bit via a gear arrangement, but this involves an inherent delay due to the time required to arrest the motor. Alternatively or additionally, the rotating spindle can be braked by engaging the spindle with a part of the hammer housing, in some way. The preferred way of cutting off rotary drive to the bit is by the use of a releasable clutch arrangement in the drive train between the motor of the hammer and the spindle.

The present invention aims to provide an improved design of clutch for cutting off rotary drive to the bit when a blocking event is detected.

According to an aspect of the present invention, there is provided an overload clutch assembly for a power tool having a spindle for rotatingly driving a working member of the tool and a spindle rotary drive train for rotatingly driving the spindle, the assembly comprising:

an overload clutch having a first mode in which rotary drive is transmitted to the spindle when a torque below a first predetermined level is applied to the clutch, and transmission of rotary drive to the spindle is cut when a torque above said first predetermined level is applied to the clutch, and at least one second mode in which rotary drive is transmitted to the spindle when a torque below a respective second predetermined level, lower than said first predetermined torque, is applied to the clutch, and transmission of rotary drive to the spindle is cut when a torque above said second predetermined level is applied to the clutch; and at least one actuator device for switching said overload clutch between said first mode and at least one said second mode.

By providing an overload clutch assembly which has a first, higher torque, mode and at least one second, lower torque, mode, this provides the advantage of enabling the tool to be selectively operated between a higher torque mode and a safer, lower torque mode, in response to detection of blocking of the working member of the tool or on initial switching on of the tool.

In a preferred embodiment, the overload clutch comprises at least one driving gear adapted to be driven by a rotary drive train of the tool, at least one first driven gear for transmitting rotary drive to the spindle, a first coupling device for coupling at least one said driving gear and at least one said first driven gear in said first mode when a torque below said first predetermined level is applied to the clutch and enabling decoupling of said driving gear and first driven gear when a torque above the first predetermined level is applied to the clutch, at least one respective second driven gear for transmitting rotary drive to the spindle, and at least one respective second coupling device for coupling at least one said driving gear and at least one said second driven gear when a torque below the corresponding said second predetermined level is applied to the clutch in at least one said second mode, and enabling decoupling of said driving gear and second driven gear when a torque above the second predetermined level is applied to the clutch.

Preferably, at least one said coupling device couples at least one driving gear and at least one corresponding driven gear by means of a respective set of locking elements acting between at least one said driving gear and at least one corresponding said driven gear.

A plurality of said locking elements may comprise ball bearings.

A plurality of said locking elements may comprise rollers.

The actuator device may be adapted to fix the rotational position of at least one said second driven gear relative to at least one said first driven gear in said first mode.

In a preferred embodiment, at least one said first driven gear and at least one said second driven gear are mounted to a common shaft, wherein at least one said second driven gear is non-rotatably mounted to said shaft in the first mode thereof and is rotatable relative to said shaft in the second mode thereof.

The assembly may further comprise at least one detector device for detecting blocking of a working member of the tool, wherein at least one said actuator device is adapted to switch said overload clutch to a said second mode thereof in response to detection of blocking of said working member.

At least one said actuator device may be adapted to switch the overload clutch to a said second mode thereof when the tool is switched on.

This provides the advantage of enabling the tool to automatically be set to a safer, low torque setting when the tool is initially switched on.

The assembly may further comprise at least one biasing device for urging the overload clutch to a said second mode thereof.

According to another aspect of the present invention, there is provided a switching assembly for switching an overload clutch assembly of a power tool between a first mode thereof and at least one second mode thereof, the assembly comprising:

an actuator member movable between a first position corresponding to a first mode, and at least one second position, corresponding to a respective second mode of the clutch assembly;

at least one connector member for actuating at least one actuator device of the clutch assembly in response to actuation of said actuator member; and a latching device for releasably retaining said actuator member in at least one said second position.

The assembly may further comprise at least one biasing device for urging the actuator device of the clutch assembly t o at least one said second mode thereof.

At least one said biasing device may comprise a flexible lever.

At least one said connector member may comprise a cable.

Said latching device may comprise at least one releasable abutment for abutting a resilient member provided on said actuator member.

The assembly may further comprise a release device for releasing said latching device.

Said release device may comprise an electromagnet for displacing said abutment.

Said release device may be adapted to be actuated on switching on of the tool.

According to a further aspect of the present invention, there is provided a power tool comprising a spindle for rotatingly driving an output member of the tool;

a spindle rotary drive train for rotatingly driving the spindle; and an overload clutch assembly as defined above.

The tool may further comprise a switching assembly as defined above.

According to a further aspect of the present invention, there is provided a hand held, preferably motor driven, power tool, comprising:

a spindle for rotatingly driving a tool or bit;

a spindle rotary drive train for rotatingly driving the spindle;

an overload clutch in the spindle rotary drive train for transmitting rotary drive to the spindle below a predetermined torque and for cutting transmission of rotary drive above the predetermined torque; and an arrangement for detecting blocking events; characterised in that the overload clutch is arranged to cut off rotary drive to the spindle when a blocking event is detected.

Power tools with a rotatingly driven spindle, in particular if they are highly powered tools, such as rotary hammers, generally have an overload clutch in the drive train for rotatingly driving the spindle. Such an overload clutch can help in the event of a blocking event, if the user has a strong grip on the tool, because when the tool housing begins to rotate, the torque required to rotatingly drive the spindle will increase. If the torque increases to above the predetermined threshold then the overload clutch will stop transmitting rotary drive and drive will no longer be transmitted to the spindle. The overload clutch also acts to reduce damage to components of the tool, for example the motor of the tool, when high torques are experienced. According to the first aspect of the present invention an overload clutch is modified to provide cutting off of rotary drive to the spindle in response to a blocking event being detected. The overload clutch may be located in any part of the gear train from the motor of the tool to the spindle, and may for example by the type of overload clutch known in the field which is mounted around the spindle.

In order to cut off rotary drive to the spindle, the predetermined torque of the overload clutch above which transmission of rotary drive is cut off can be reduced in response to the detection of a blocking event. The overload clutch may still provide the function of known overload clutches, depending on the level at which the predetermined torque is set when no blocking event is detected. In accordance with the present invention most types of overload clutch known for use in the drive train of a rotary tool can be adapted to reduce the torque at which they stop transmitting rotary drive in response to the detection of a blocking event. The torque at which the overload clutch stops transmitting rotary drive may be reduced to substantially zero in response to the detection of a blocking event.

The present invention is particularly applicable to rotary hammers as they are generally powerful tools and are known to experience problems from blocking events. Such rotary hammers generally comprise a hammering mechanism, generally located within the spindle, for generating repeated impacts on a tool or bit mounted at a forward end of the spindle. The spindle is preferably made of as few parts as possible, but it may include a separate tool holder portion located coaxially and forwardly from the portion of the spindle in which the hammering mechanism is mainly located.

It is known to use arrangements for detecting blocking events which are purely mechanical, for example using inertial masses, in which case these arrangements can act mechanically on the overload clutch. Such a mechanical arrangement may include an inertial mass pivotally mounted within the housing of the tool. According to one embodiment of the present invention, the arrangement for detecting blocking events may comprise an inertial mass pivotally mounted within the tool housing and comprising a latch for engaging an actuator of the overload clutch and a spring is provided for urging the actuator of the clutch into a cut off position. These components are arranged such that when a blocking event occurs, the inertial mass pivots in the housing to disengage the latch from the actuator and the spring urges the actuator into the cut off position in which the actuator causes the rotary drive to the spindle to be cut off. This can provide a quick and accurate way of detecting a blocking event.

It is also known to use an electromechanical arrangement, which utilises for example, an inertial mass and senses the movement of the mass when a blocking event is occurring to generate an electrical output signal.

It is also known to detect blocking events electronically. For example, the arrangement for detecting blocking events may comprise a sensor, for example an accelerometer, a torque sensor, a motor current or voltage sensor or other types of sensor known in the art for detecting blocking events. The sensor senses an operational condition of the tool, for example an accelerometer will detect vibrations of the tool and a torque sensor may detect a relative torque between components of the tool. The outputs from the sensor are fed into an electronic evaluation unit for analysing the signals from the sensor and for generating an electrical output signal when a blocking event is detected. Examples of such electronic evaluation units are disclosed in U.S. Pat. No. 5,914,882, EP771,619 and U.S. Pat. No. 5,584,619.

Where the arrangement for detecting blocking events generates an electrical output signal in response to the detection of a blocking event, then the overload clutch may include an electromechanical interface, for example an electromagnet acting on a magnetic element, which interface is responsive to the output signal to reduce the torque at which the overload clutch slips.

Generally an overload clutch will comprise a driven gear and a driving gear and a coupling element, for example a resilient element or clutch balls biased by a resilient element, for coupling the driven gear and driving gear below the predetermined torque and for enabling de-coupling of the driven gear and the driving gear above the predetermined torque. According to one embodiment of the present invention the arrangement for detecting blocking events acts on the coupling element to cut off rotary drive to the spindle when a blocking event is detected. The coupling element may be a resilient element which couples the driven gear and the driving gear via a set of locking elements mounted on one of the driven gear and the driving gear and engageable with the other of the driven gear and the driving gear in order to transmit rotary drive therebetween. The arrangement for detecting blocking events may act to move the coupling element, such as a resilient element, with respect to the driven and driving gears in order to vary the torque at which the overload clutch slips. Alternatively, the driven gear can be coupled to the output of the overload clutch by a drive coupling and the arrangement for detecting blocking events acts on the drive coupling to cut off the transmission of rotary drive in response to the detection of a blocking event.

Sometimes it is desirable, in particular in a rotary hammer, to have different torques at which the rotary drive to the spindle is cut off, in different applications of the hammer. Therefore, in one embodiment of the present invention the overload clutch may have a first mode of operation in which the overload clutch transmits rotary drive to the spindle below a first predetermined torque and stops transmission of rotary drive above the first predetermined torque, a second mode of operation in which the overload clutch transmits rotary drive to the spindle below a second predetermined torque, different from the first predetermined torque and stops transmission of rotary drive above the second predetermined torque, and a third mode of operation in which the overload clutch cuts off rotary drive to the spindle when a blocking event is detected.

The powered tool may be a rotary hammer, having a non-rotary mode and a mode change mechanism of the hammer may be arranged to cause the overload clutch to cut off rotary drive to the spindle, for example by reducing the torque at which the overload clutch stops transmitting rotary drive, when the non-rotary mode is selected. Thus, the overload clutch according to the present invention, when incorporated in a rotary hammer can additionally be used as part of the mode change mechanism of the hammer for stopping rotary drive to the hammer spindle when the mode is switched to the non-rotary mode.

According to a further aspect of the present invention there is provided a hand held, preferably motor driven electrically powered rotary hammer, comprising:

a spindle for rotatingly driving a tool or bit;

a hammering mechanism for generating repeated impacts on a tool or bit mounted at a forward end of the spindle;

a spindle rotary drive train for rotatingly driving the spindle;

a mode change mechanism for selectively disengaging a clutch in the spindle rotary drive train so as to cut off the rotary drive to the spindle; and an arrangement for detecting blocking events; characterised in that the clutch is arranged to disengaged when a blocking event is detected.

Rotary hammers are well known with mode change mechanisms which are used to selectively provide rotary drive to a spindle of the hammer. For example, in a drilling only mode or a rotary hammering mode of the hammer, the mode change mechanism acts to engage a clutch in the spindle rotary drive train so that rotary drive is transmitted to the spindle. In hammering only mode the mode change mechanism acts to disengage the clutch. Many such mode change mechanisms for selectively cutting off drive to the spindle are known in the art and would be suitable for use in the present invention. In addition rotary hammers may also have a part of the mode change mechanism for selectively disengaging the hammering mechanism, as is well known in the art. According to the second aspect of the present invention the clutch in the spindle drive train acted on by the mode change mechanism to disengage rotary drive to the spindle is also utilised to disengage rotary drive to the spindle when a blocking event is detected. Thus, the present invention has the advantage of utilising the clutch for two purposes, mode change and cutting off rotary drive when blocking events occur.

The comments above in relation to the arrangement for detecting blocking events also apply to this second aspect of the present invention.

In one embodiment the clutch includes a spindle drive gear arrangement axially slideably mounted on the spindle and selectively engageable with part of the spindle drive train in order to rotatingly drive the spindle. In this case the arrangement for detecting blocking events acts on the spindle drive gear arrangement to move the spindle drive gear arrangement axially along the spindle and out of engagement with the part of the spindle drive train when a blocking event is detected. According to this embodiment, the mode change arrangement can also act on the spindle drive gear arrangement to move the spindle drive gear arrangement axially along the spindle and out of engagement with the part of the spindle drive train, when a non-rotary mode is selected.

The clutch may additionally be an overload clutch of the type described above in relation to the first aspect of the present invention.

According to a further aspect of the present invention there is provided a hand held, preferably motor driven electrically powered rotary hammer, comprising:

a spindle for rotatingly driving a tool or bit;

a hammering mechanism for generating repeated impacts on a tool or bit mounted at a forward end of the spindle;

a spindle rotary drive train for rotatingly driving the spindle;

an overload clutch in the spindle rotary drive train for transmitting rotary drive to the spindle below a predetermined torque and for cutting transmission of rotary drive above the predetermined torque;

a mode change mechanism for selectively cutting off the rotary drive to the spindle; characterised in that the overload clutch has:

a first mode of operation in which the overload clutch transmits rotary drive to the spindle below a first predetermined torque and stops transmission of rotary drive above the first predetermined torque;

a second mode of operation in which the overload clutch transmits rotary drive to the spindle below a second predetermined torque, different from the first predetermined torque, and stops transmission of rotary drive above the second predetermined torque; and a third mode of operation in which the overload clutch cuts off rotary drive to the spindle in response to the mode change mechanism.

In one embodiment of this third aspect of the present invention overload clutch may comprise a driven gear and a driving gear and a coupling element for coupling the driven gear and driving gear below the predetermined torques and for enabling de-coupling the driven gear and the driving gear above the predetermined torques and a drive coupling for coupling the driven gear to the output of the clutch, wherein the mode change arrangement acts on the drive coupling to alter the predetermined torque and to stop the transmission of rotary drive. There may be two driven gears and one of the driven gears can be coupled to the output of the clutch via the drive coupling so that the overload clutch has a first predetermined torque, the other or both of the driven gears can be coupled to the output of the clutch via the drive coupling so that the overload clutch has a second predetermined torque, different from the first or neither of the driven gears can be coupled to the output of the clutch via the drive coupling so that the transmission of rotary drive is stopped.

Preferred embodiments of the present invention will now be described, by way of example only and not in any limitative sense, with reference to the accompanying drawings in which.

Figure 13:
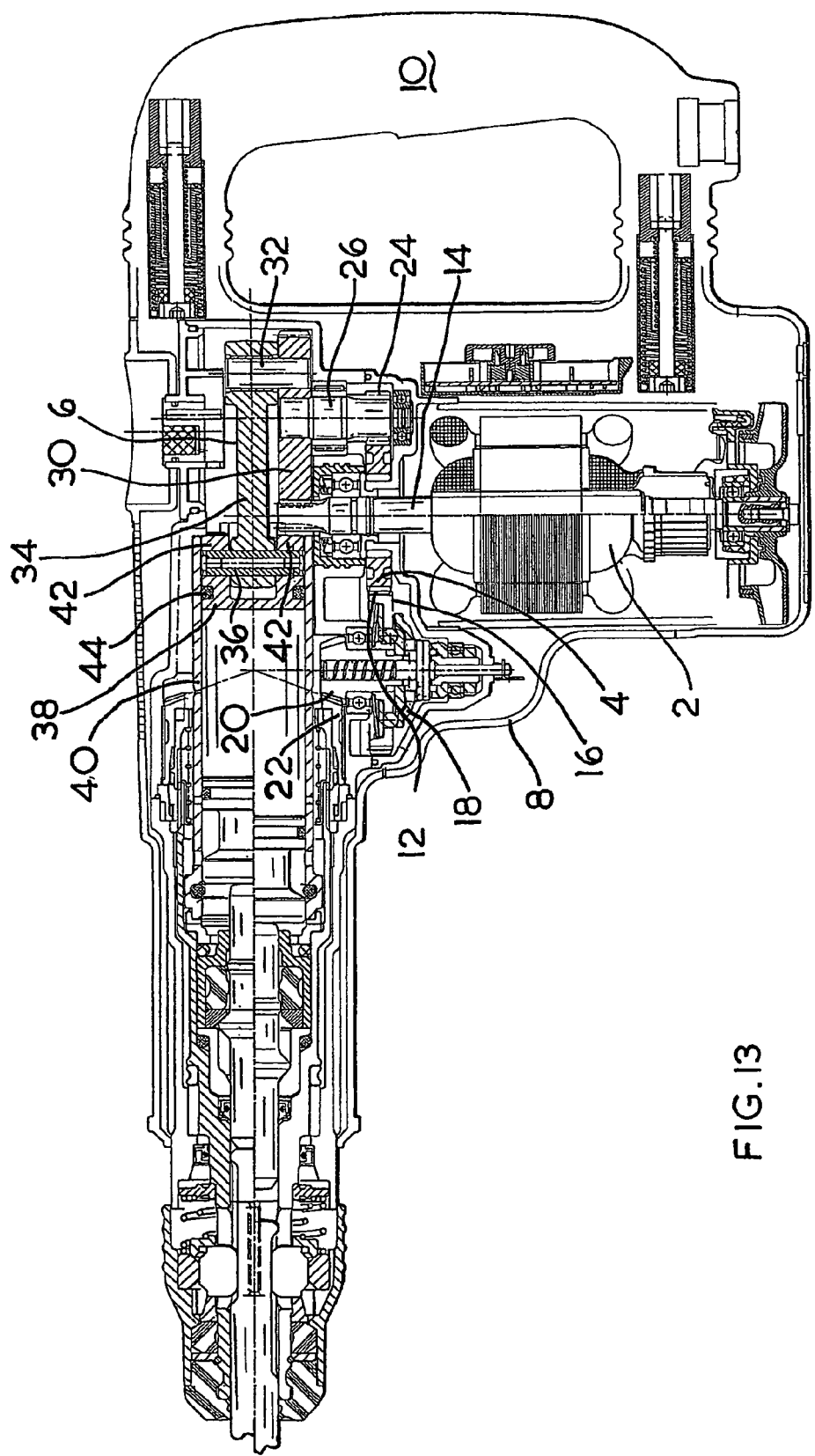
FIG. 13 is a cross sectional side elevation view of a hammer of a further embodiment of the present invention.
Figure 14:
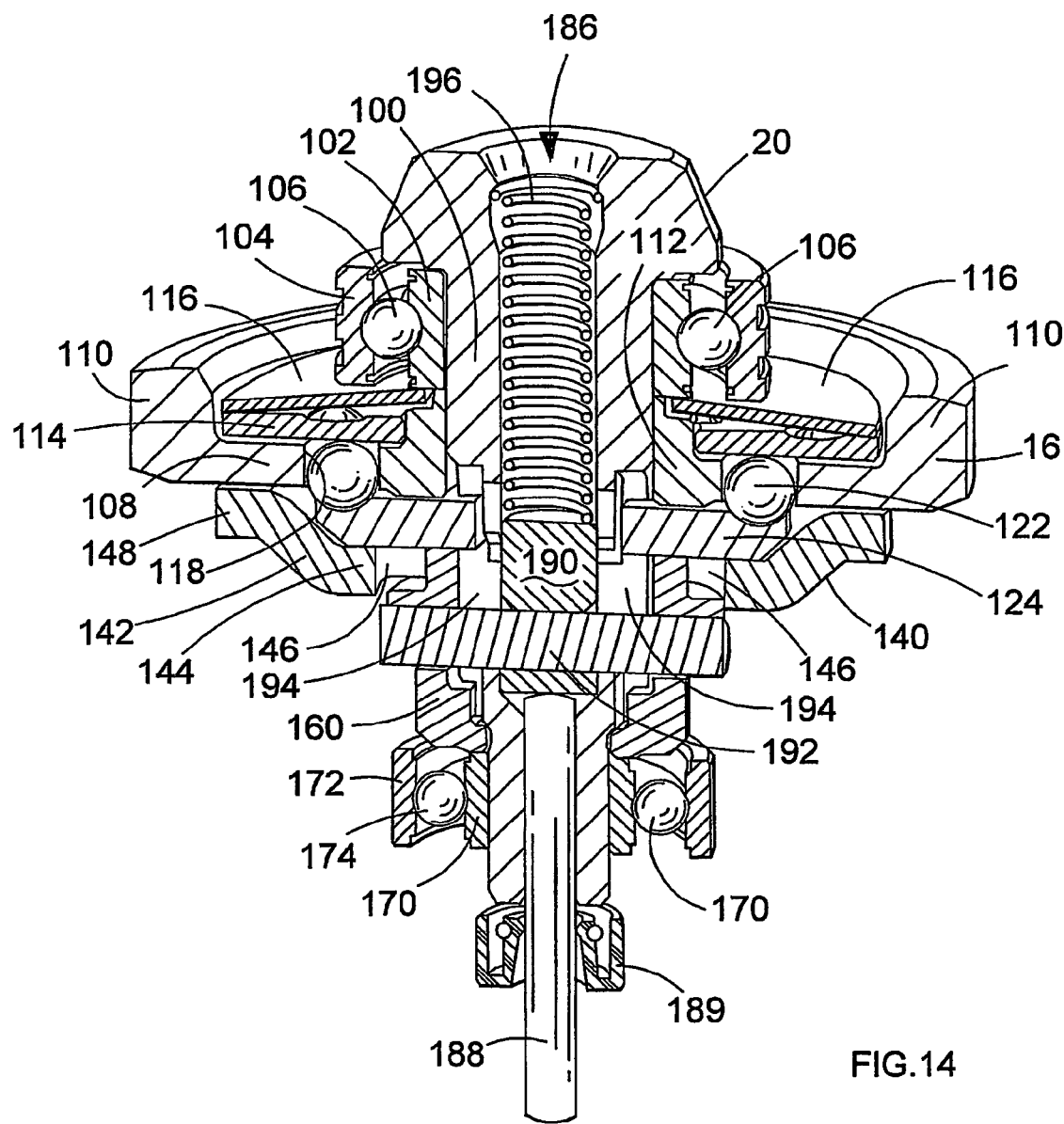
FIG. 14 is a partially cut away perspective view of an overload clutch assembly of a further embodiment of the present invention.
Figure 15:
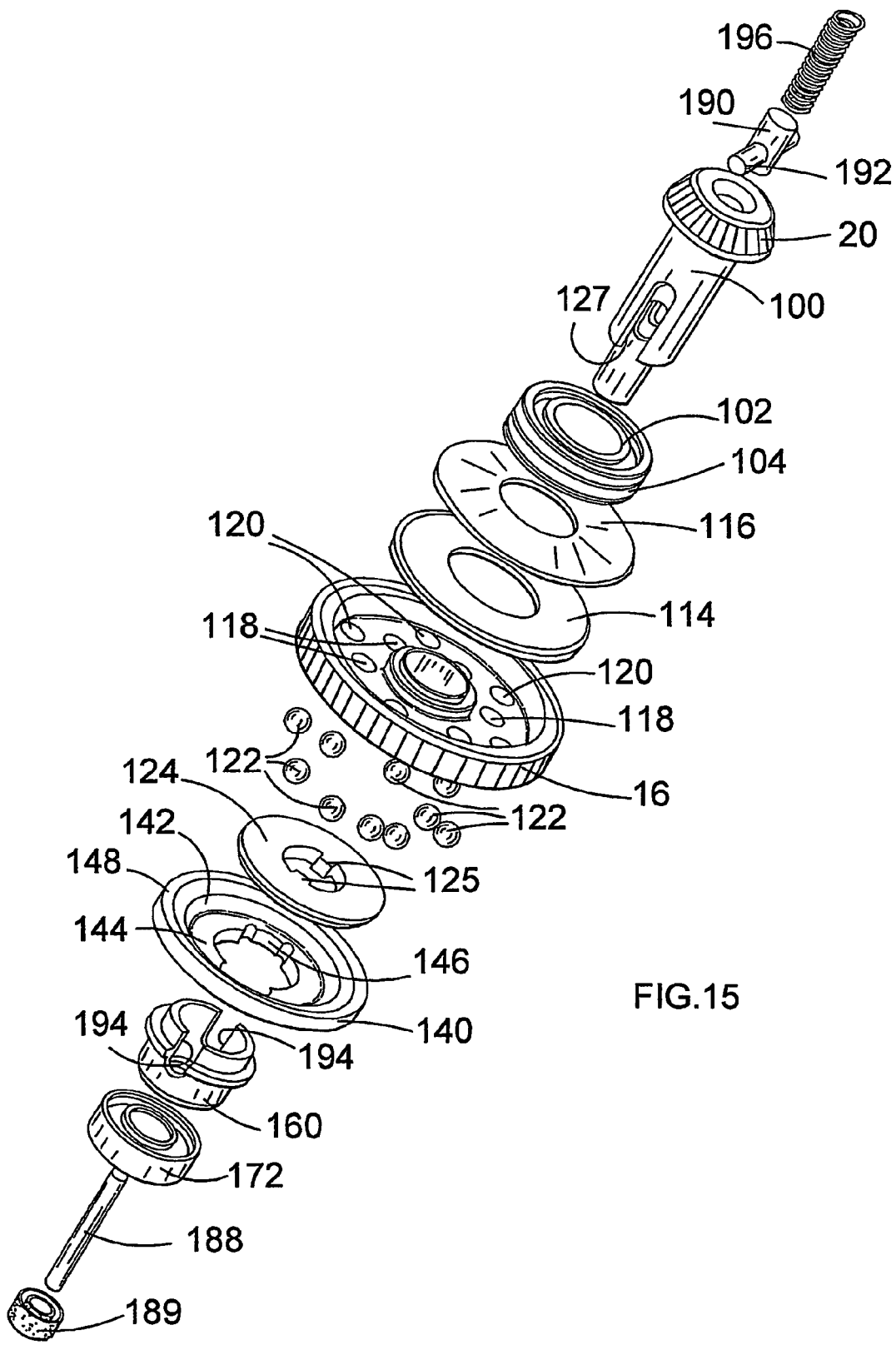
FIG. 15 is an exploded perspective view of the clutch assembly of FIG. 14.
Figure 16A:
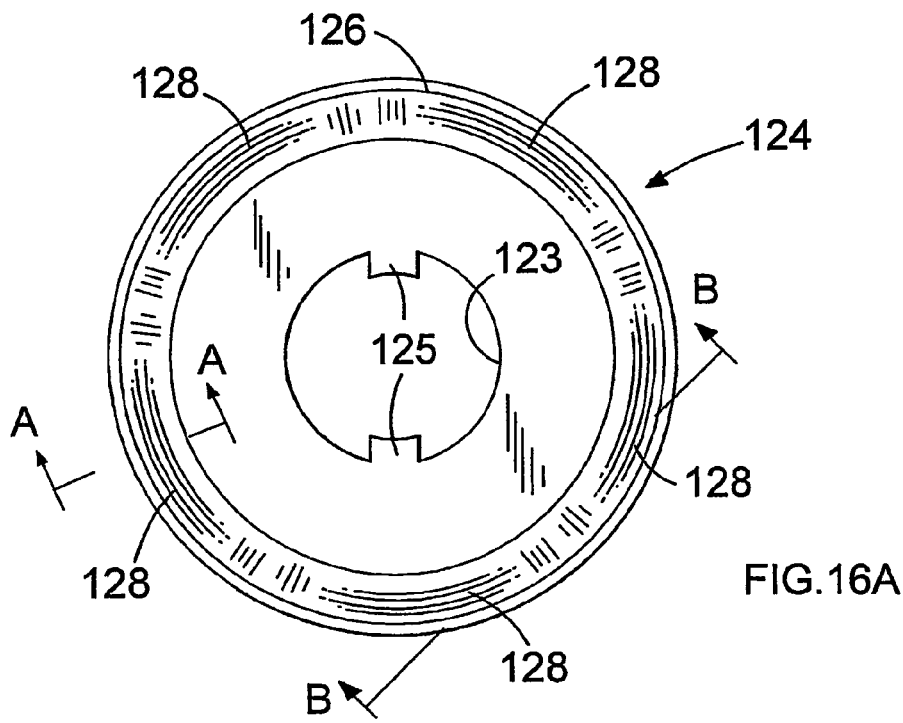
Figure 16B:
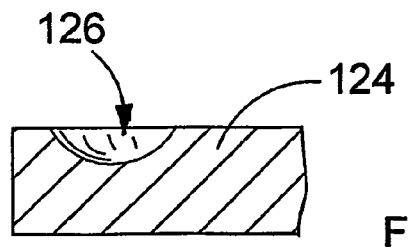
Figure 16C:
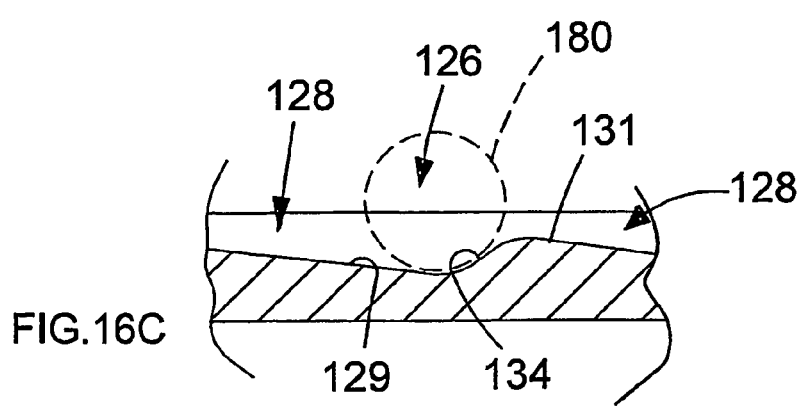
Figure 17A:
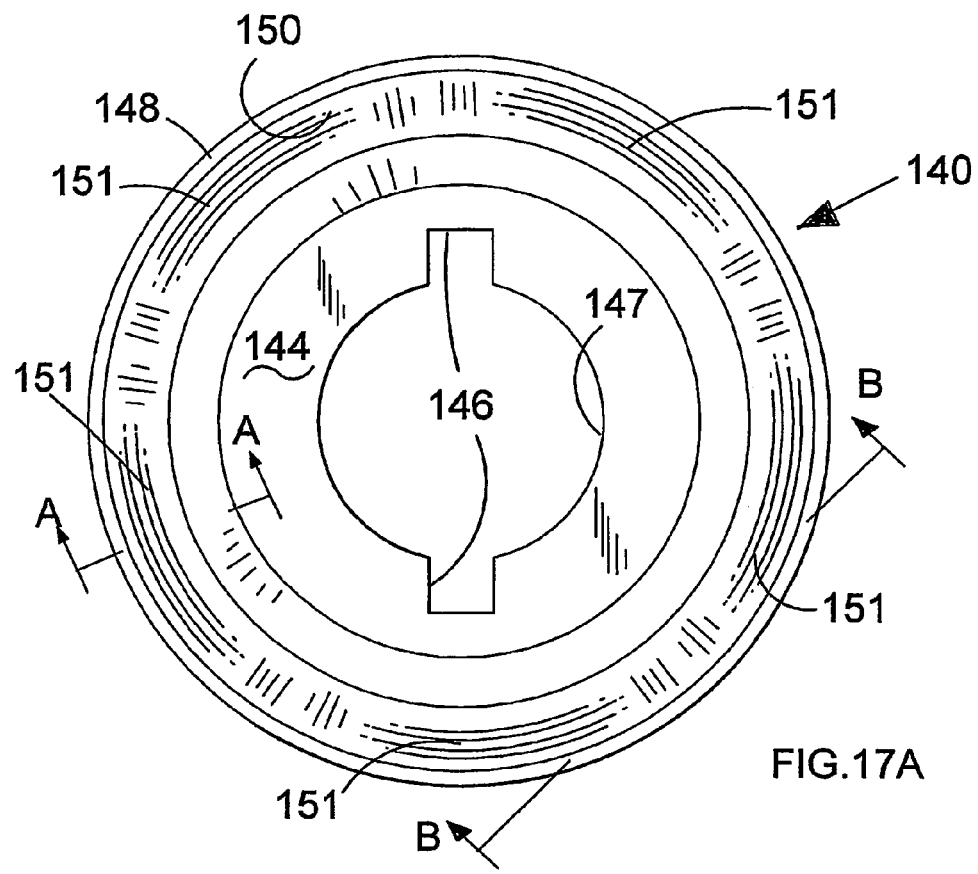
Figure 17B:
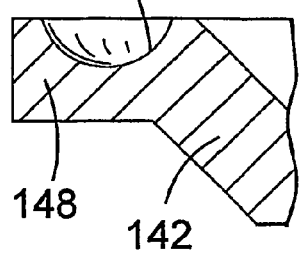
Figure 17C:
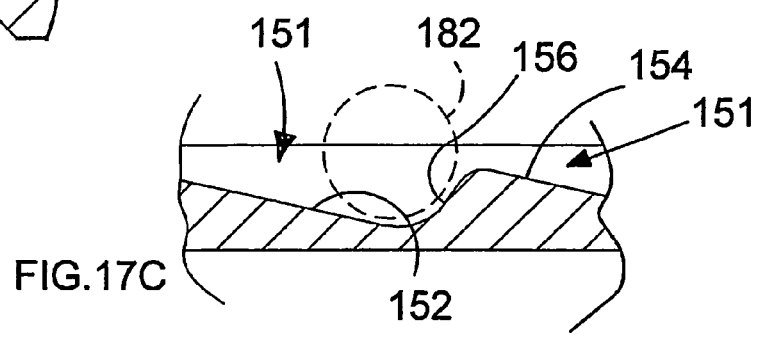
Figure 18:
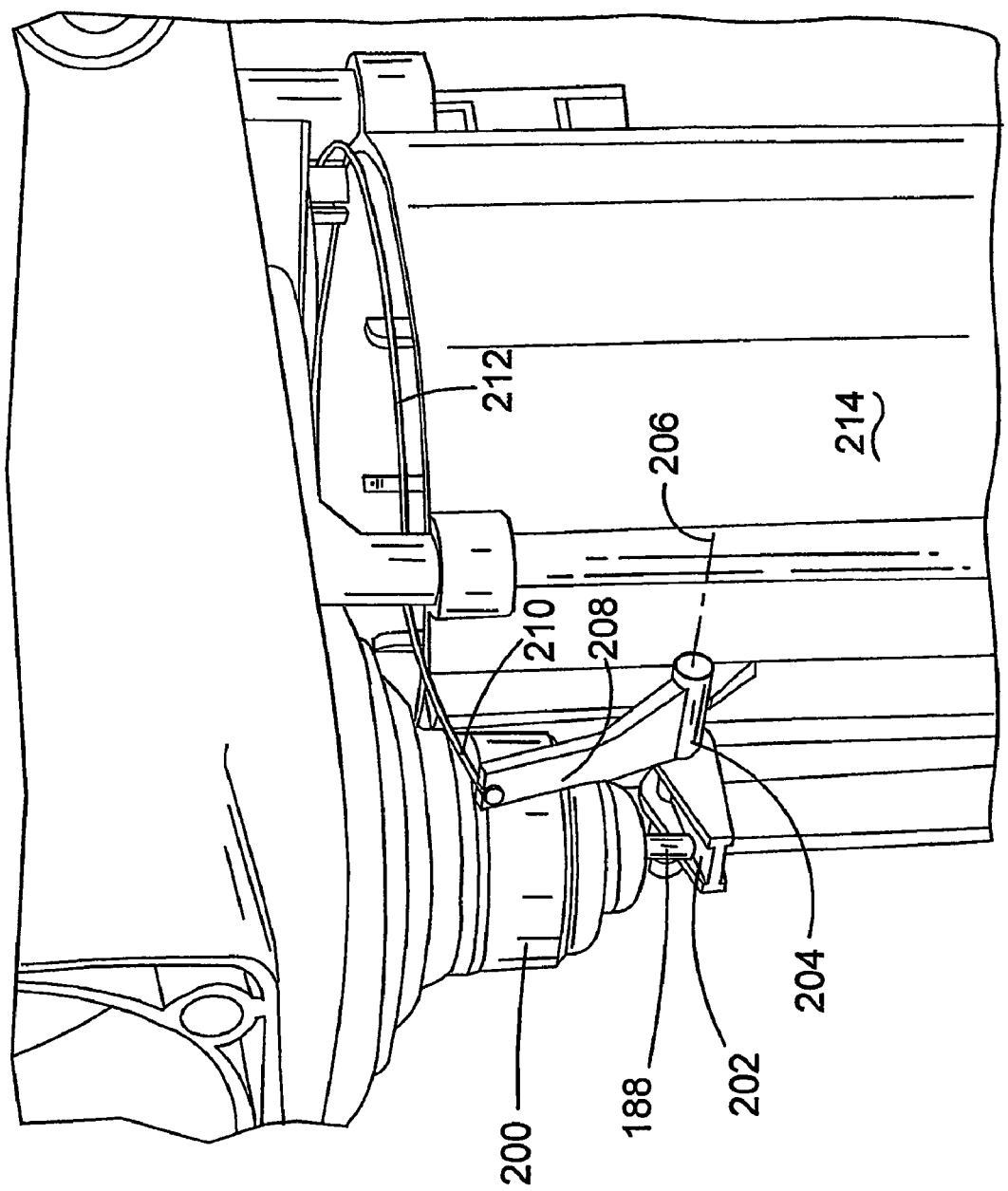
Figure 19:
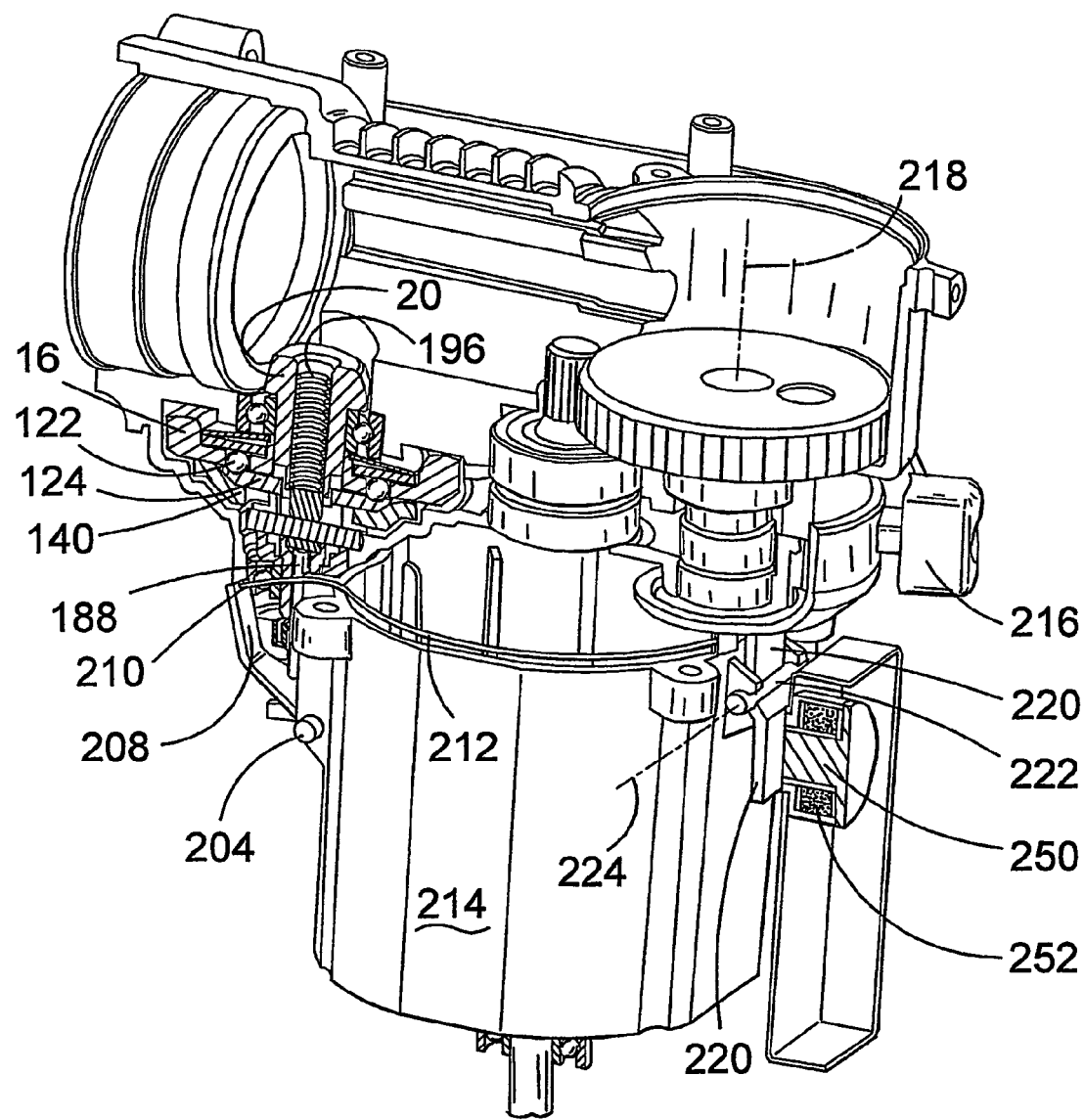
Figure 20:
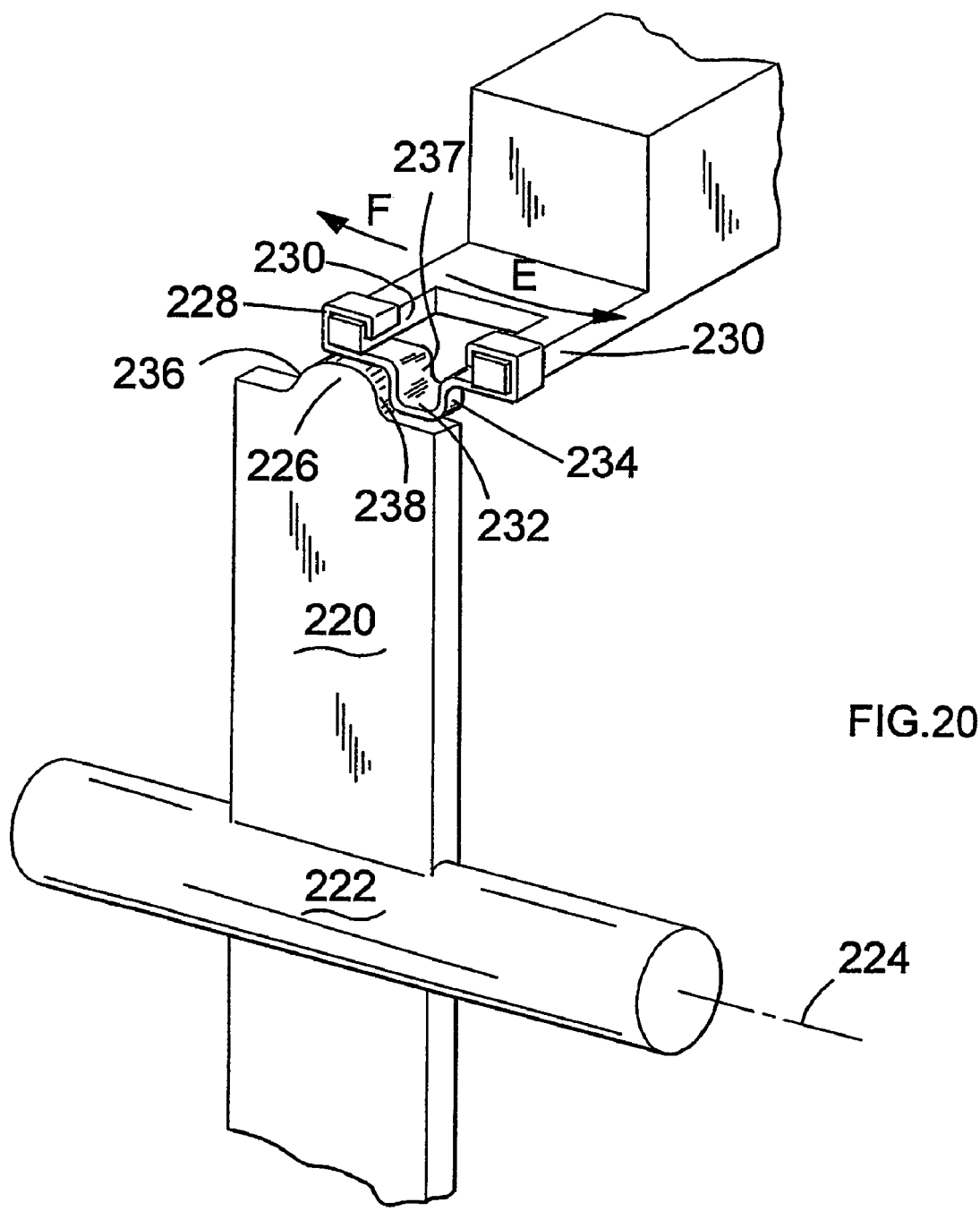
Figure 21:
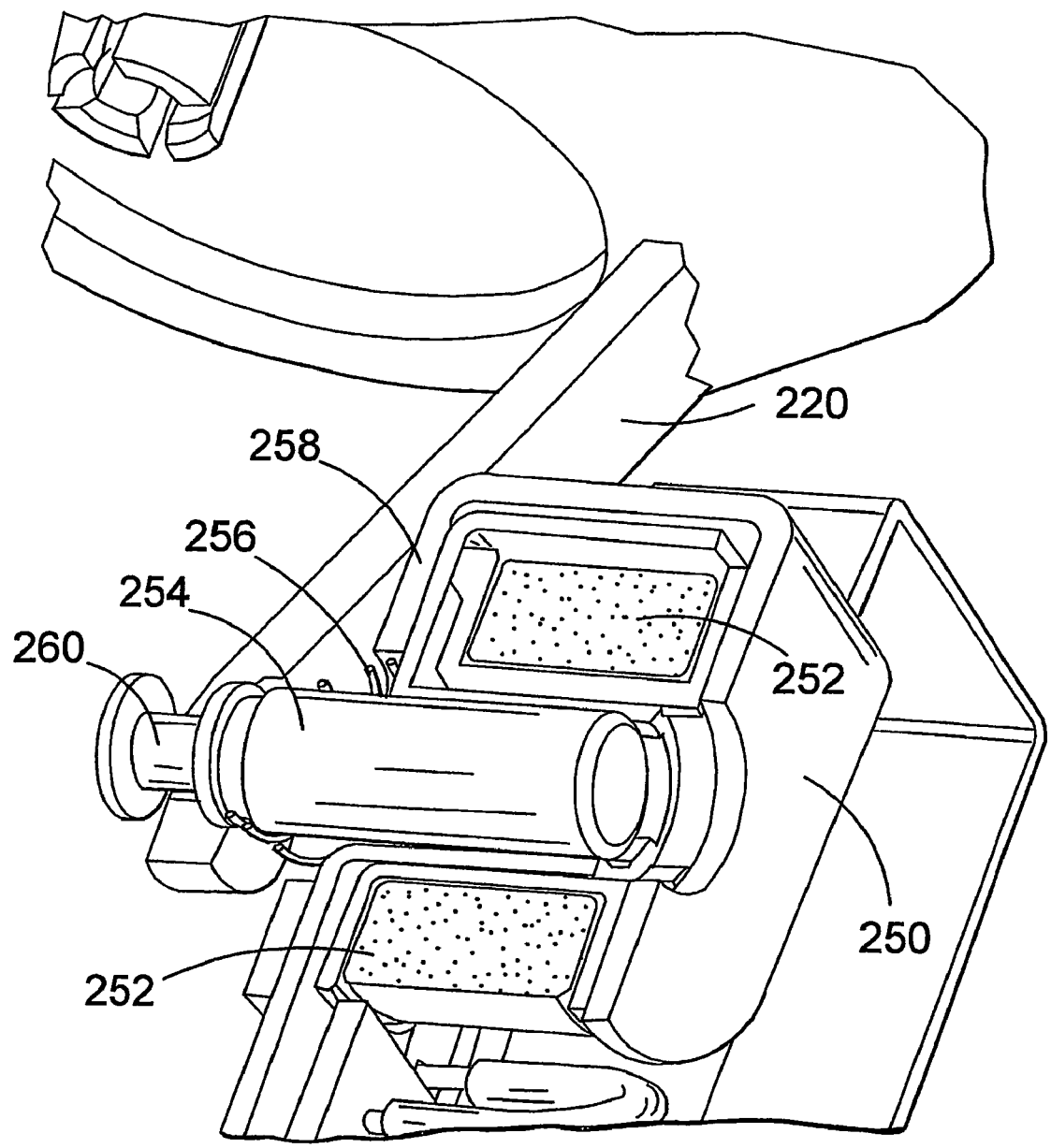
Figure 22:
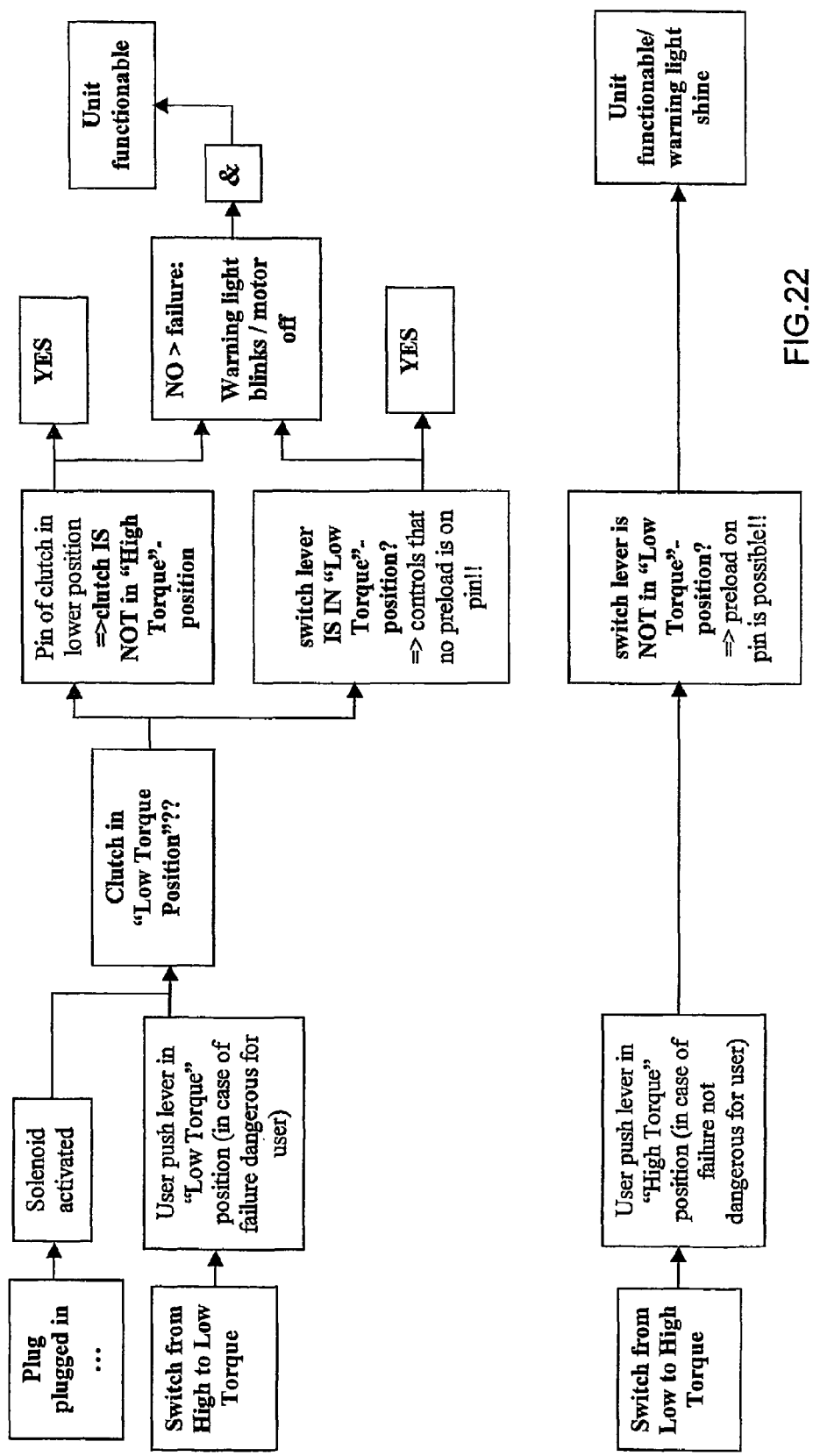

FIGS. 16A to C show details of a first driven gear of the clutch assembly of FIGS. 14 and 15;

FIGS. 17A to 17C show details of a second driven gear of the clutch assembly of FIGS. 14 and 15;

FIG. 18 shows a schematic perspective view of a switching assembly of the hammer of FIG. 13;

FIG. 19 shows a schematic partially cutaway view of part of the hammer of FIG. 14;

FIG. 20 is a schematic perspective view of a latching arrangement of the switching assembly of FIG. 18;

FIG. 21 is a detailed view of a release mechanism for the latching mechanism of FIG. 20; and FIG. 22 is a logic diagram for the release mechanism of FIG. 21.

In the Figures like parts are identified by like numerals.

Figure 1:
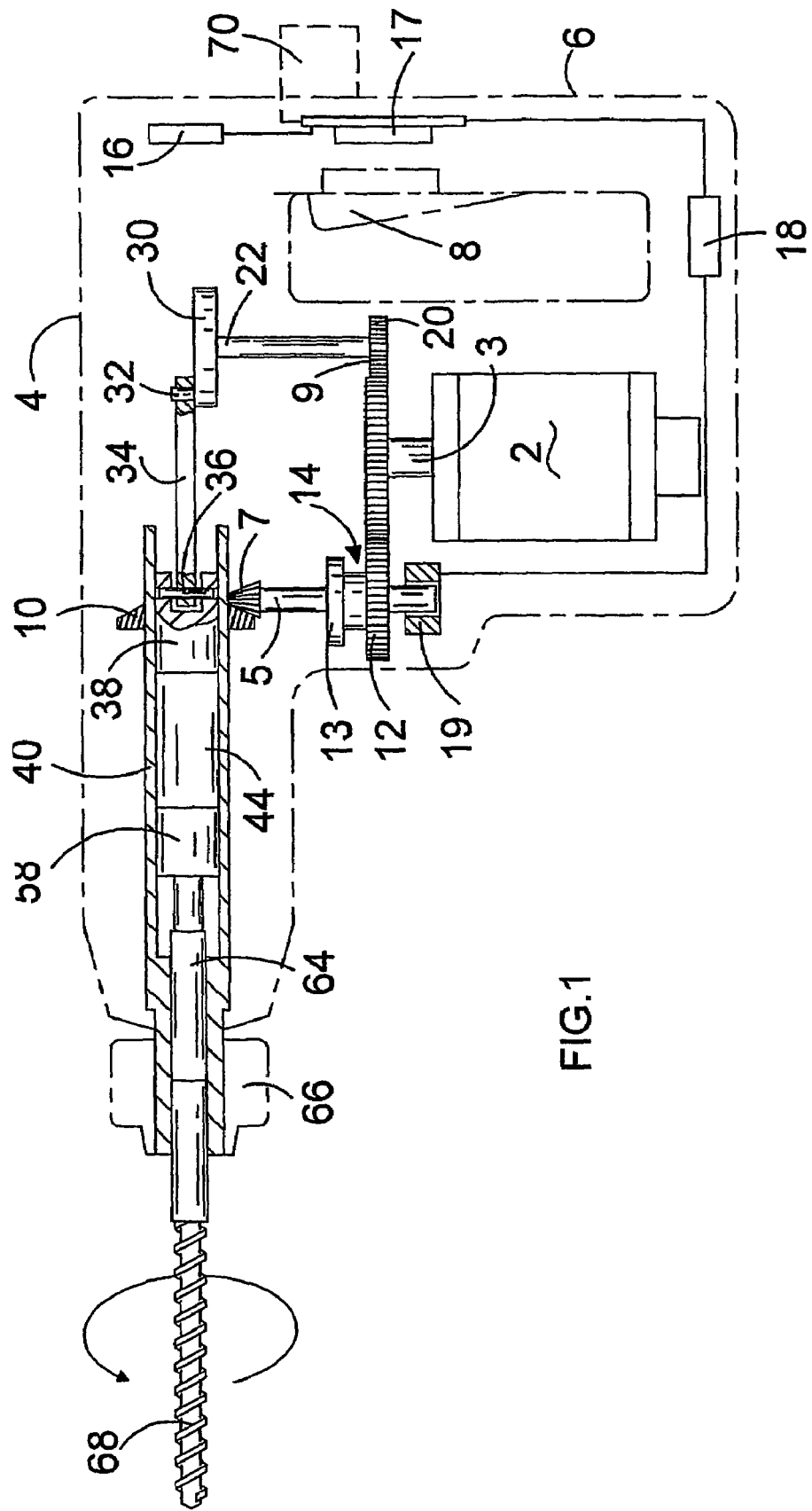
FIG. 1 shows a partially cutaway longitudinal cross section through a rotary hammer of a first embodiment of the present invention.

The hammer shown in FIG. 1 comprises an electric motor (2), an spindle drive train and a crank drive arrangement which are housed within a metal gear housing (not shown) surrounded by a plastic housing (4). A rear handle housing incorporating a rear handle (6) and a trigger switch arrangement (8) is fitted to the rear of the housing (4). A cable (not shown) extends through a cable guide and connects the motor to an external electricity supply. Thus, when the cable is connected to the electricity supply and the trigger switch arrangement (8) is depressed the motor (2) is actuated to rotationally drive the armature of the motor. The metal gear housing is made from magnesium with steel inserts and rigidly supports the components housed within it.

A driving gear (9) is press fitted onto the motor pinion (3) and has teeth which engage the teeth of a driving gear (12) of an overload clutch arrangement (14) to rotatingly drive the driving gear (12). The driving gear (12) rotatingly drives a driven gear (13) of the overload clutch arrangement (14) when the torque transmitted between the two gears (12, 13) is below a predetermined threshold and if no blocking event is detected. The driven gear (13) is press fit onto a spindle drive shaft (5), formed with a bevel pinion (7) at its end remote from the driven gear wheel (13). The bevel pinion meshes with a beveled spindle drive gear (10) which drive gear is non-rotatably mounted on the spindle (40). The overload clutch arrangement (14) is described in more detail below with respect to FIGS. 2 and 3.

The teeth of the driving gear (9) also engage the teeth of a crank drive gear (20) to rotatingly drive the drive gear (20). The drive gear (20) is non-rotatably mounted on a crank drive spindle (22) which spindle is rotatably mounted within the gear housing. A crank plate (30) is non-rotatably mounted at the end of the drive spindle remote from the drive gear (20), which crank-plate is formed with an eccentric bore for housing an eccentric crank pin (32). The crank pin (32) extends from the crank plate into a bore at the rearward end of a con-rod or crank arm (34) so that the con-rod (34) can pivot about the crank pin (32). The opposite forward end of the con-rod (34) is formed with a bore through which extends a trunnion pin (36) so that the con-rod (34) can pivot about the trunnion pin. The trunnion pin (36) is fitted to the rear of a piston (38) by fitting the ends of the trunnion pin (36) into receiving bores formed in a pair of opposing arms, which arms extend to the rear of the piston (38). The piston is reciprocally mounted in a cylindrical hollow spindle (40) so that it can reciprocate within the hollow spindle. An O-ring seal is fitted in an annular recess formed in the periphery of the piston (38) so as to form an air tight seal between the piston (38) and the internal surface of the hollow spindle (40).

Thus, when the motor (2) is actuated, the armature pinion (3) rotatingly drives the driving gear (9) and the driving gear rotatingly drives the crank drive spindle (22) via the drive gear (20). The drive spindle rotatingly drives the crank plate (30) and the crank arm arrangement comprising the crank pin (32), the con-rod (34) and the trunnion pin (36) convert the rotational drive from the crank plate (30) to a reciprocating drive to the piston (38). In this way the piston (38) is reciprocatingly driven back and forth along the hollow spindle (40), when the motor (2) is actuated by depression of the trigger switch (8). The driving gear (9) also drives the driving gear (12) of the clutch arrangement (14) which drives the driven gear (13) of the clutch arrangement. The driven gear (13) of the clutch arrangement rotatingly drives the spindle drive shaft (5) which rotatingly drives the spindle drive gear (10) and thus the spindle (40) via the bevel pinion (7).

A ram (58) is located within the hollow spindle (40) forwardly of the piston (38) so that it can also reciprocate within the hollow spindle (40). An O-ring seal is located in a recess formed around the periphery of the ram (58) so as to form an air tight seal between the ram (58) and the spindle (40). In the operating position of the ram (58), with the ram located rearward of venting bores (not shown) in the spindle a closed air cushion (44) is formed between the forward face of the piston (38) and the rearward face of the ram (58). Thus, reciprocation of the piston (38) reciprocatingly drives the ram (58) via the closed air cushion (44). When the hammer enters idle mode (ie. when the hammer bit is removed from a workpiece), the ram (58) moves forwardly, past the venting bores. This vents the air cushion and so the ram (58) is no longer reciprocatingly driven by the piston (38) in idle mode, as is well known in the art.

A beatpiece (64) is guided so that it can reciprocate within forward portion of the spindle. A bit or tool (68) can be releasably mounted within a tool holder (66) so that the bit or tool (68) can reciprocate to a limited extent within a tool holder portion of the spindle. When the ram (58) is in its operating mode and is reciprocatingly driven by the piston (38) the ram repeatedly impacts the rearward end of the beatpiece (64) and the beatpiece (64) transmits these impacts to the rearward end of the bit or tool (68) as is known in the art. These impacts are then transmitted by the bit or tool (68) to the material being worked.

In the arrangement in FIG. 1, an operational condition of the rotary hammer is monitored by a sensor, such as an angular accelerometer (16). The signals from the sensor (16) are transmitted via an input interface to an electronic evaluation unit, which may be formed as a microcontroller (17). The micro-controller analyses the signals from the accelerometer (16) and is programmed to generate an output signal when a blocking event is about to occur. For example, the arrangement of the type described in U.S. Pat. No. 5,584,619, U.S. Pat. No. 5,914,882 or EP 771,619 can be used to generate an output signal when a blocking event is about to occur. The warning signal triggers a circuit (18) powered by the power supply to the motor (2) of the hammer. The circuit (18), when triggered supplies electric current to an electromagnet (19) which causes the clutch arrangement (14) to disengage in order to interrupt the drive from the driving gear (9) to the spindle drive shaft (5).

Figure 2:
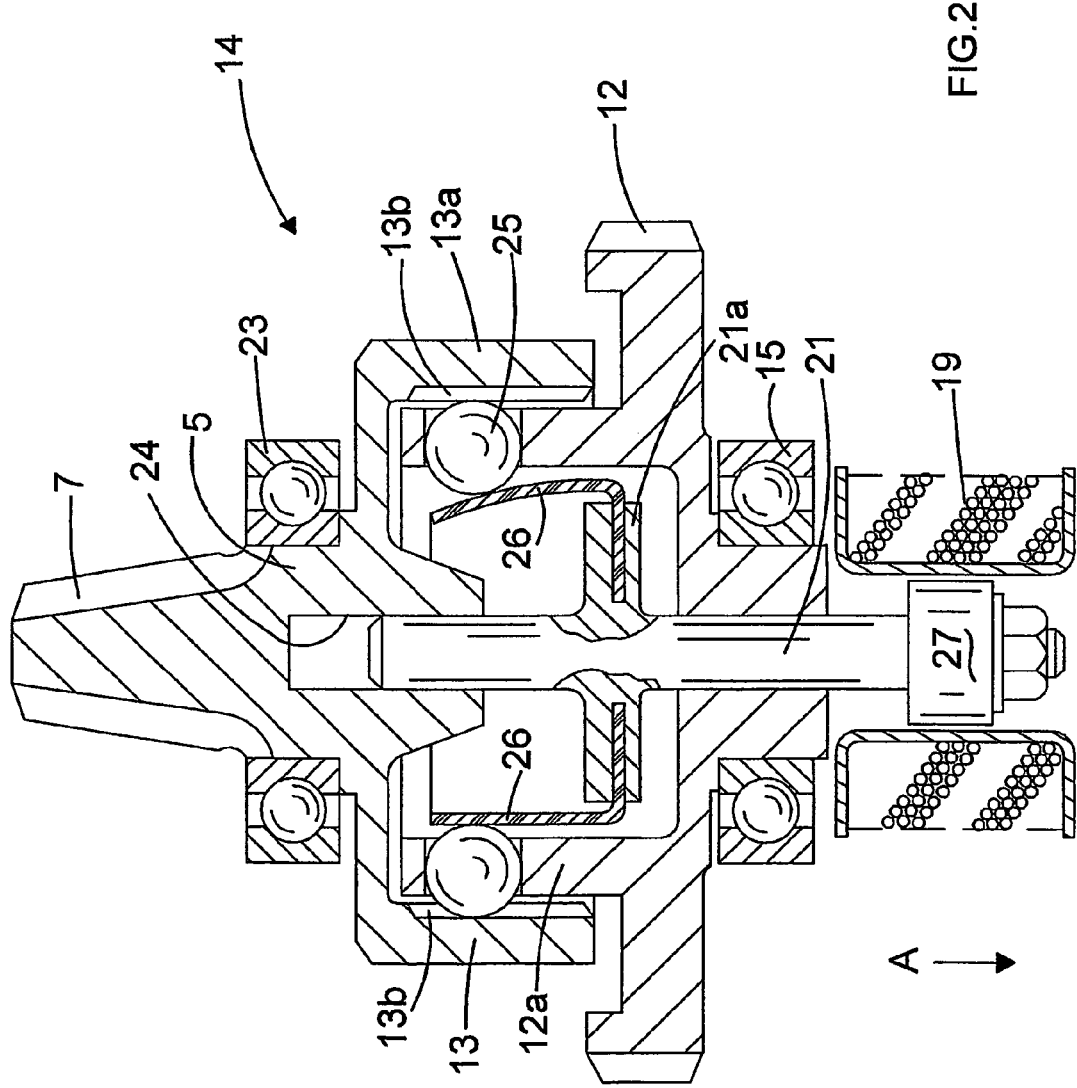
FIG. 2 shows a longitudinal cross-section through a first embodiment of an overload clutch of the rotary hammer of FIG. 1.

One embodiment of an overload clutch arrangement suitable for use in the arrangement of FIG. 1 is shown in FIG. 2. The driving gear (12) of the overload clutch arrangement (14) is rotationally mounted within the hammer housing via a bearing (15). The driving gear (12) is mounted to rotate about an actuating shaft (21), which actuating shaft is axially slideable with respect to the driving gear. The driven gear (13) of the overload clutch arrangement (14) is rotationally mounted within the hammer housing via a bearing (23). The driven gear (13) is also mounted to rotate about the axially slideable actuating shaft (21) and is formed with a bore (24) for axially slidably receiving a first end of the actuating shaft (21).

Rotary drive is transmitted between the driving gear (12) and the driven gear (13) of the overload clutch arrangement (14) via a plurality of locking balls (25). The driving gear (12) is formed with a cylindrical sleeve portion (12*a*) which extends within a cylindrical sleeve portion (13*a*) of the driven gear (13). The locking balls (25) are mounted in corresponding holes radially formed through the cylindrical sleeve portion (12*a*). The balls are mounted so as to be shiftable in a radial direction. The actuating shaft (21) has an increased diameter portion (21*a*) which is slideable within the cylindrical sleeve portion (12*a*) of the driving gear (12). A cylindrical sleeve (26) is mounted on the increased diameter portion (21*a*) of the actuating shaft, co-axial with and in the space between the actuating shaft (21) and the cylindrical sleeve portion (12*a*). The cylindrical sleeve (26) is resilient and acts to bias the locking balls (25) into a radially outward position in which the locking balls engage a corresponding set of pockets (13*b*) formed in the radially inwardly facing surface of the cylindrical sleeve portion (13*a*) of the driven gear. The pockets (13*b*) (see left hand side of FIG. 2) are separated by a set of sloped ridges. When the locking balls (25) engage the pockets (13*b*) rotary drive is transmitted between the driving gear (12) and the driven gear (13) and rotational drive is transmitted via the spindle drive shaft (5) to the spindle (40).

When the actuating shaft (21) is the position shown in FIG. 2, the clutch arrangement (14) acts as an overload clutch. Below a predetermined torque, the resilient sleeve (26) biases the locking balls (25) into engagement with the pockets (13*b*) in the driven gear (13) to thereby transmit rotation from the driving gear (12) to the driven gear (13). Thus, rotary drive is transmitted to the spindle (40) via the spindle drive shaft (5). However, above the predetermined torque, the biasing force from the resilient sleeve (26) becomes insufficient to bias the locking balls (25) into the pockets (13*b*) in the driven gear (13) and the balls can move radially inwardly to ride up the slopes and over the ridges between the pockets (13*b*) (see right hand side of FIG. 2). Thus, the driven gear (13) rotates with respect to the driving gear (12) and rotary drive to the spindle drive shaft (5) and thus to the spindle (40) is cut-off.

The overload clutch arrangement of FIG. 2, also acts to cut-off rotary drive to the spindle (40) when a blocking event is detected. When the signals from the accelerometer (16) are analysed by the microprocessor (17) so that the microprocessor determines that a blocking event is occurring, an output signal is output from the microprocessor into the circuit (18). This causes the circuit (18) to apply current to an electromagnet (19). The electromagnet is mounted in the hammer housing (4) so that it surrounds an end of the actuating shaft (21) remote from the end received in the bore (24) of the driven gear (13). A magnetic element (27) is mounted on the end of the actuating shaft (21) surrounded by the electromagnet (19). When current is supplied to the electromagnet (19) a magnetic force is created between the electromagnet (19) and the magnetic element (27) which draws the magnetic element downwardly in the direction of the arrow A of FIG. 2. The actuating shaft (21) moves downwardly until the increased diameter portion (21*a*) of the actuating shaft (21) abuts the base of the cylindrical sleeve (12*a*) of the driving gear (12). This movement of the actuating shaft (21) moves the resilient sleeve (26) downwardly in the direction of the arrow A until only the upper edge of the resilient sleeve engages the locking balls (25). Thus, the radially outwardly biasing force on the locking balls (25) from the biasing sleeve (26) is significantly reduced and the locking balls move radially inwardly, out of the pockets (13*a*) in the cylindrical sleeve (13*a*) of the driven gear (13). Thus, rotary drive to the driven gear (13) and so to the spindle (40) via the spindle drive shaft (5) is cut off. Accordingly, as soon as current is supplied to the electromagnet (19) from the circuit (18), the clutch arrangement (14) is disengaged and no further rotary drive is transmitted via the clutch arrangement (14) to the spindle (40). In this way the potentially dangerous consequences of a blocking event are avoided. A return spring can be provided to return the actuating shaft (21) to its original position.

It should be noted that disengagement of the clutch arrangement (14) of FIG. 2 could also be used to switch the hammer into its hammering only mode position in which no rotary drive is transmitted to the spindle (40). This mode change could be performed electromechanically using the electromagnet (19) to move the actuating shaft (21) or could be done mechanically by utilising mechanical means to shift the actuating shaft.

Figure 3:
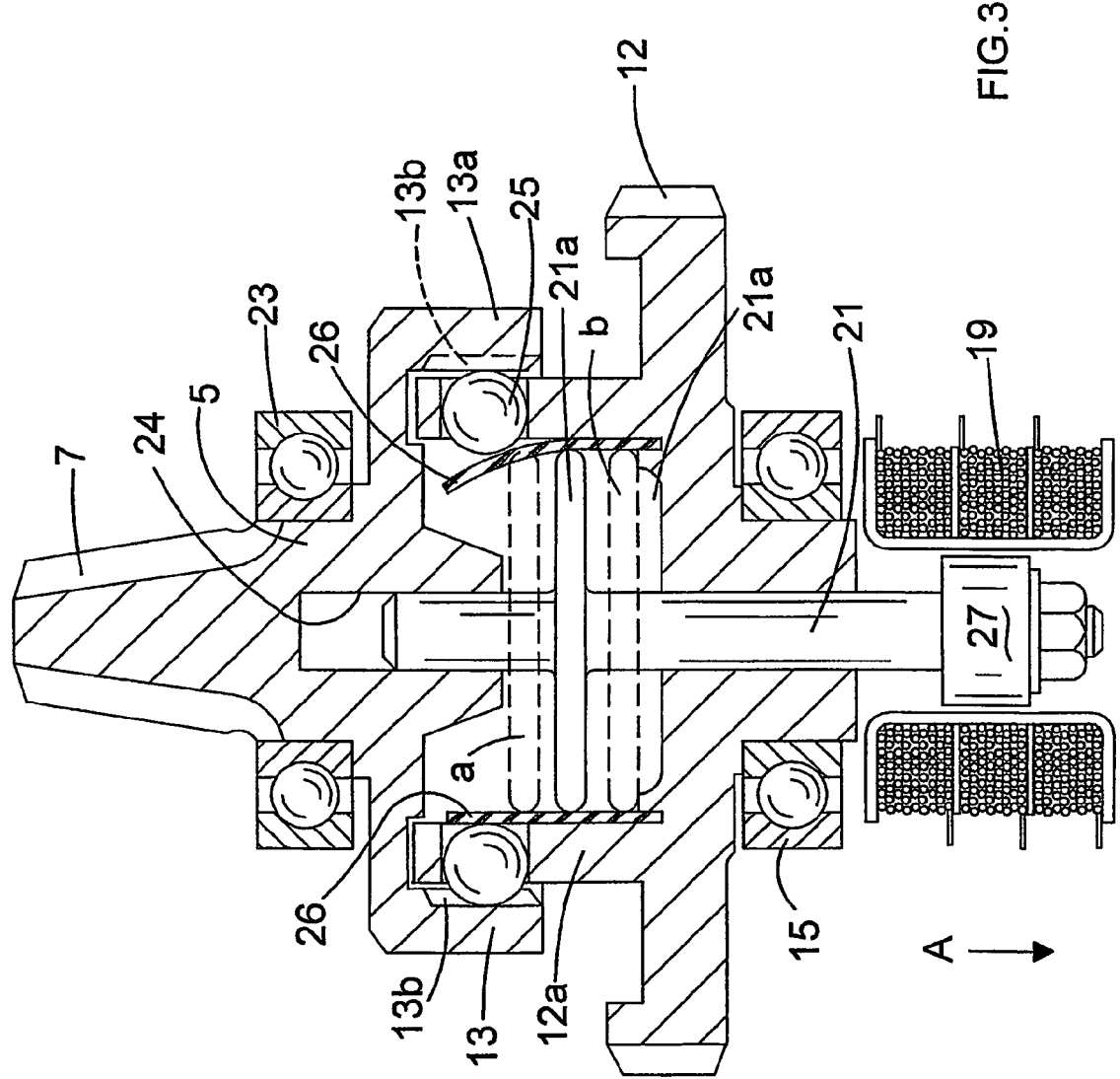
FIG. 3 shows a longitudinal cross-section through a second embodiment of overload clutch of the rotary hammer of FIG. 1.

A second embodiment of an overload clutch arrangement suitable for use in the arrangement of FIG. 1 is shown in FIG. 3. The driving gear (12), driven gear (13) and actuating shaft (21) are mounted in the housing as described for the FIG. 2 embodiment. Rotary drive is transmitted between the driving gear (12) and the driven gear (13) of the overload clutch arrangement (14) via a plurality of locking balls (25). The driving gear (12) is formed with a cylindrical sleeve portion (12a) which extends within a cylindrical sleeve portion (13a) of the driven gear (13). The locking balls (25) are mounted in corresponding holes formed through the cylindrical sleeve portion (12a) so as to be shiftable in a radial direction. The actuating shaft (21) has an increased diameter portion (21a) which is slideable within the cylindrical sleeve portion (12a) of the driving gear (12). A cylindrical sleeve (26) is located within the cylindrical sleeve portion (12a), co-axial with and in the space between the actuating shaft (21) and the cylindrical sleeve portion (12a). The cylindrical sleeve (26) is resilient and the increased diameter portion (21a) of the actuating shaft bears on the internal surface of the resilient sleeve (24) to reinforce a biasing force from the resilient sleeve which biases the locking balls (25) into a radially outward position in which the locking balls engage a corresponding set of pockets (13b) formed in the radially inwardly facing surface of the cylindrical sleeve portion (13a) of the driven gear. The pockets (13b) are separated by a set of sloped ridges. When the locking balls (25) engage the pockets (13b) (see left hand side of FIG. 3) rotary drive is transmitted between the driving gear (12) and the driven gear (13) and rotational drive is transmitted via the spindle drive shaft (5) to the spindle (40).

When the increased diameter portion (21a) of the actuating shaft (21) is the position shown in dotted lines (a) FIG. 3, the clutch arrangement (14) acts as an overload clutch. Below a predetermined torque, the resilient sleeve (26), reinforced by the increased diameter portion (21a) of the actuating shaft (21) biases the locking balls (25) into engagement with the pockets (13b) in the driven gear (13) to thereby transmit rotation from the driving gear (12) to the driven gear (13). Thus, rotary drive is transmitted to the spindle (40) via the spindle drive shaft (5). However, above the predetermined torque, the biasing force from the resilient sleeve (26) becomes insufficient to bias the locking balls (25) into the pockets (13b) in the driven gear (13) and the balls can move radially inwardly (see right hand side of FIG. 3) to ride up the slopes and over the ridges between the pockets (13b). Thus, the driven gear (13) rotates with respect to the driving gear (12) and rotary drive to the spindle drive shaft (5) and thus to the spindle (40) is cut-off.

The overload clutch arrangement of FIG. 3, also acts to cut-off rotary drive to the spindle (40) when a blocking event is detected. An electromagnet (19) is mounted in the hammer housing (4) so that it surrounds an end of the actuating shaft (21) remote from the end received in the bore (24) of the driven gear (13). A magnetic element (27) is mounted on the end of the actuating shaft (21) surrounded by the electromagnet (19). When current is supplied to the electromagnet (19) a magnetic force is created between the electromagnet (19) and the magnetic element (27) which draws the magnetic element downwardly in the direction of the arrow A of FIG. 3 into the position shown in dotted lines (b) in FIG. 3. The actuating shaft (21) moves downwardly until the increased diameter portion (21a) of the actuating shaft (21) abuts a rim of the base of the cylindrical sleeve (12a) of the driving gear (12). This movement of the actuating shaft (21) moves the increased diameter portion (21a) of the actuating shaft (21) downwardly in the direction of the arrow A until it bears against only the lower edge of the resilient sleeve (26). Thus, the radially outwardly biasing force on the locking balls (25) from the biasing sleeve (26) is significantly reduced and the locking balls move radially inwardly (see right hand side of FIG. 3), out of the pockets (13a) in the cylindrical sleeve (13a) of the driven gear (13). Thus, rotary drive to the driven gear (13) and so to the spindle (40) via the spindle drive shaft (5) is cut off. Accordingly, as soon as current is supplied to the electromagnet (19) from the circuit (18), the clutch arrangement (14) is disengaged and no further rotary drive is transmitted via the clutch arrangement (14) to the spindle (40). In this way the potentially dangerous consequences of a blocking event are avoided. A return spring can be provided to return the actuating shaft (21) to its original position.

It should be noted that disengagement of the clutch arrangement (14) of FIG. 3 could also be used to switch the hammer into its hammering only mode position in which no rotary drive is transmitted to the spindle (40). This mode change could be performed electromechanically using the electromagnet (19) to move the actuating shaft (21) or could be done mechanically by utilising mechanical means to shift the actuating shaft.

The cut off of rotary drive to the spindle (40) is achieved by utilising an already existing component in the drive train to the hammer mechanism, ie. the overload clutch. In the embodiments of FIGS. 1 to 3, the overload clutch arrangement is altered to enable it also to cut off rotary drive to the spindle (40) by reducing the torque at which the overload clutch slips when a blocking event is detected.

Figure 4:
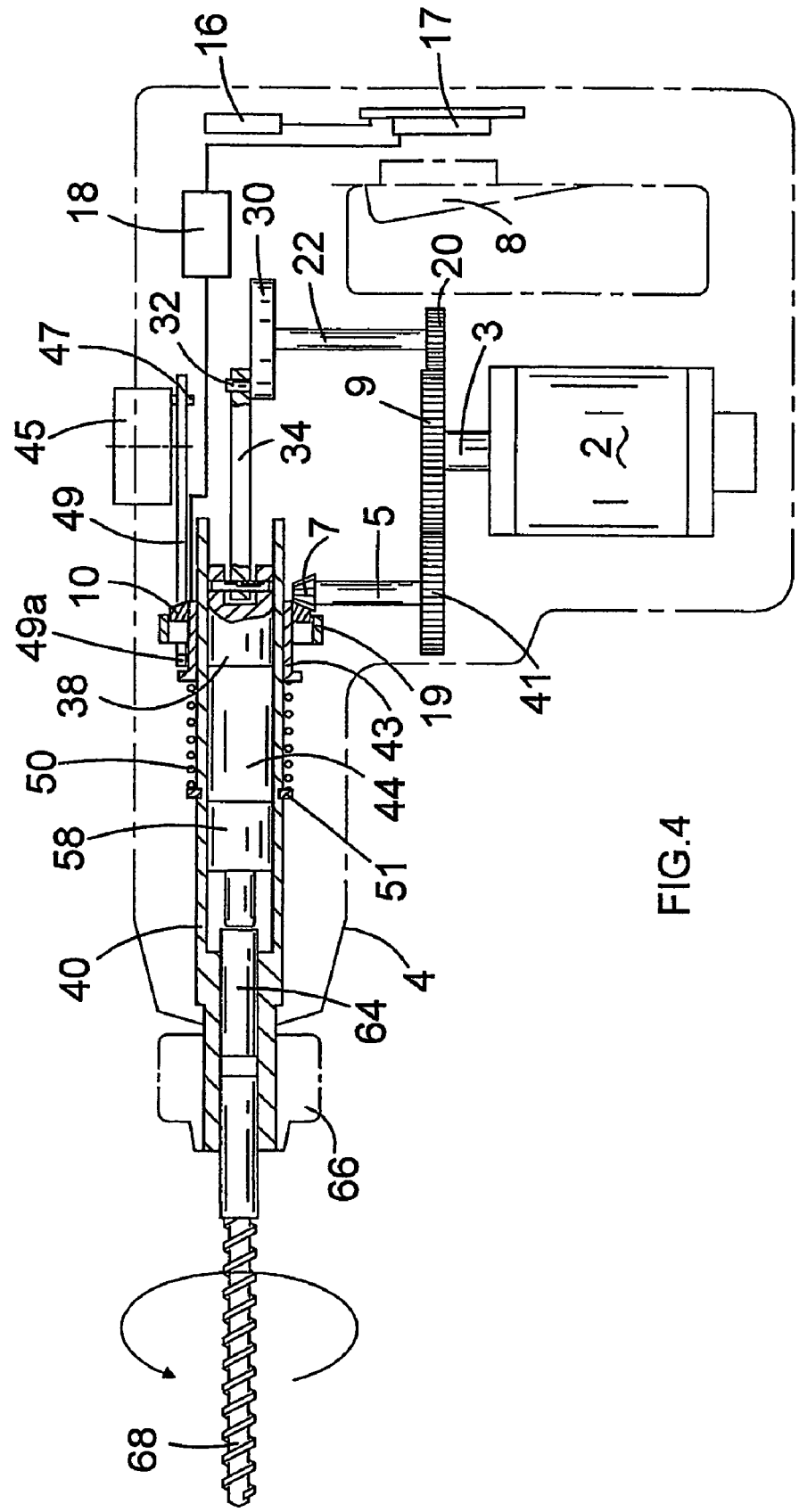
FIG. 4 shows a partially cutaway longitudinal cross section through a rotary hammer of a further embodiment of the present invention.

A rotary hammer according to a second aspect of the present invention is shown in FIG. 4. The hammer in FIG. 4 differs from that in FIG. 1 in that the rotary drive train from the motor (2) to the spindle (40) is different. The drive from the driving gear (9) is transmitted to the spindle drive shaft (5) via a gear wheel (41) press fit onto the spindle drive shaft. At its end remote from the gear wheel (41) the spindle drive shaft (5) is formed with a pinion (7) which is engageable with a spindle drive gear (10). The spindle drive gear (10) is mounted on a sliding sleeve (43), which sliding sleeve is axially slideably but rotationally fixedly mounted on the spindle (40). The mounting of the spindle drive gear (10) on the slider sleeve (43) may be a rotationally and axially fixed mounting, as shown in FIG. 4, arranged such that rotation of the spindle drive gear (10) rotatingly drives the sliding sleeve (43) and so rotatingly drives the spindle (40). Alternatively, this mounting may be via an overload clutch as is known in the art, arranged such that rotation of the spindle drive gear (10) rotatingly drives the sliding sleeve (43) to rotatingly drive the spindle (40) below a predetermined torque and slips relative to the sliding sleeve above a predetermined torque, so that above the predetermined torque the spindle (40) is no longer rotatingly driven.

The hammer shown in FIG. 4, has two modes hammering only mode and rotary hammer mode. FIG. 4 shows the rotary hammer mode in which the pinion (7) of the spindle drive shaft (5) engages the spindle drive gear (10), which is a bevel gear, to rotatingly drive the spindle (40) via the sliding sleeve (43). Thus, a tool (68) mounted within the forward end of the spindle is rotatingly driven via the spindle and simultaneously receives repeated impacts from the beatpiece (64) of the hammering mechanism. A mode change knob (45) is rotationally mounted within the hammer housing (4) and is formed with an eccentric pin (47), which pin extends into the hammer housing (4). The eccentric pin (47) is received within a recess at the first rearward end of a mode change linkage (49). The forward end of the mode change linkage is formed with a finger (49a) which finger is engageable with a raised peripheral rim at the forward end of the sliding sleeve (43). In the position shown in FIG. 4, the mode change knob is turned to its rotary hammer mode position and the finger (49a) of the linkage (49) does not engage the sliding sleeve (43). The sliding sleeve is thus biased by a helical spring (50) into its rearward rotary hammer mode position, as shown in FIG. 4. The helical spring (50) is mounted around the spindle (40) and acts between a circlip (51) on the spindle at the forward end of the spring and the sliding sleeve (43) at the rearward end of the spring, in order to bias the sliding sleeve rearwardly.

The hammer can be changed into a hammering only mode by rotating the mode change knob (45) so that the eccentric pin (47) moves to the left in FIG. 4. The eccentric pin (47) engages the mode change linkage (49) to move it forwardly (to the left in FIG. 4). The finger (49a) of the mode change linkage engages the rim of the sliding sleeve (43) to urge it forwardly against the biasing force of the spring (50). The spindle drive gear (10) is axially fixed on the sliding sleeve and so the spindle drive gear (10) moves forwardly with the sliding sleeve (43) out of engagement with the pinion (7) of the spindle drive shaft, and so rotary drive to the spindle is shut off. In the forward position of the spindle drive gear (10) the spindle drive gear can engage a set of cooperating teeth mounted within the housing (4) to lock the spindle against rotation in its hammering only mode, as is well known in the art.

On turning the mode change knob back into rotary hammering mode position, as shown in FIG. 4, the sliding sleeve (43) is urged rearwardly back into the FIG. 4 position by the spring (50).

The rotary hammer shown in FIG. 4 has the same blocking event detecting arrangement comprising an accelerometer (16), a microprocessor (17), circuit (18) and electromagnet (19), as described above in relation to FIG. 1, except that the electromagnet (19) surrounds the spindle drive gear (10), and the circuit (18) is repositioned between the microprocessor and the electromagnet. The spindle drive gear (10) and/or the sliding sleeve (43) are formed at least partly of a magnetic material. Thus, when a blocking event is detected the circuit (18) supplies current to the electromagnet (19) and this causes a magnetic force between the electromagnet (19) and the magnetic material in the spindle drive gear and/or sliding sleeve in order to move the sliding sleeve (43) and spindle drive gear (10) forwardly (to the left in FIG. 4) against the biasing force of the spring (50) and out of engagement with the pinion (7) of the spindle drive shaft (5). In this way, when a blocking event is detected rotary drive is cut-off between the motor (2) and the spindle (40) by disengaging the driving connection between the spindle drive shaft (5) and the spindle drive gear (10). This arrangement requires only the addition of the electromagnet (19) and of magnetic material to the spindle drive gear (10) and/or sliding sleeve (43) in order to cut off rotary drive to the spindle. No further components or changes are required to be made to components already existing rotary hammer components. In the FIG. 4 embodiment, this is achieved by using the already existing mode change components for switching the rotary drive to the hammer spindle (40) on and off.

Alternatively, the rotary hammer of FIG. 4 can be designed to have an additional drilling only mode in which the hammer drive mechanism is shut off, as is well known in the art.

Figures 5, 6:
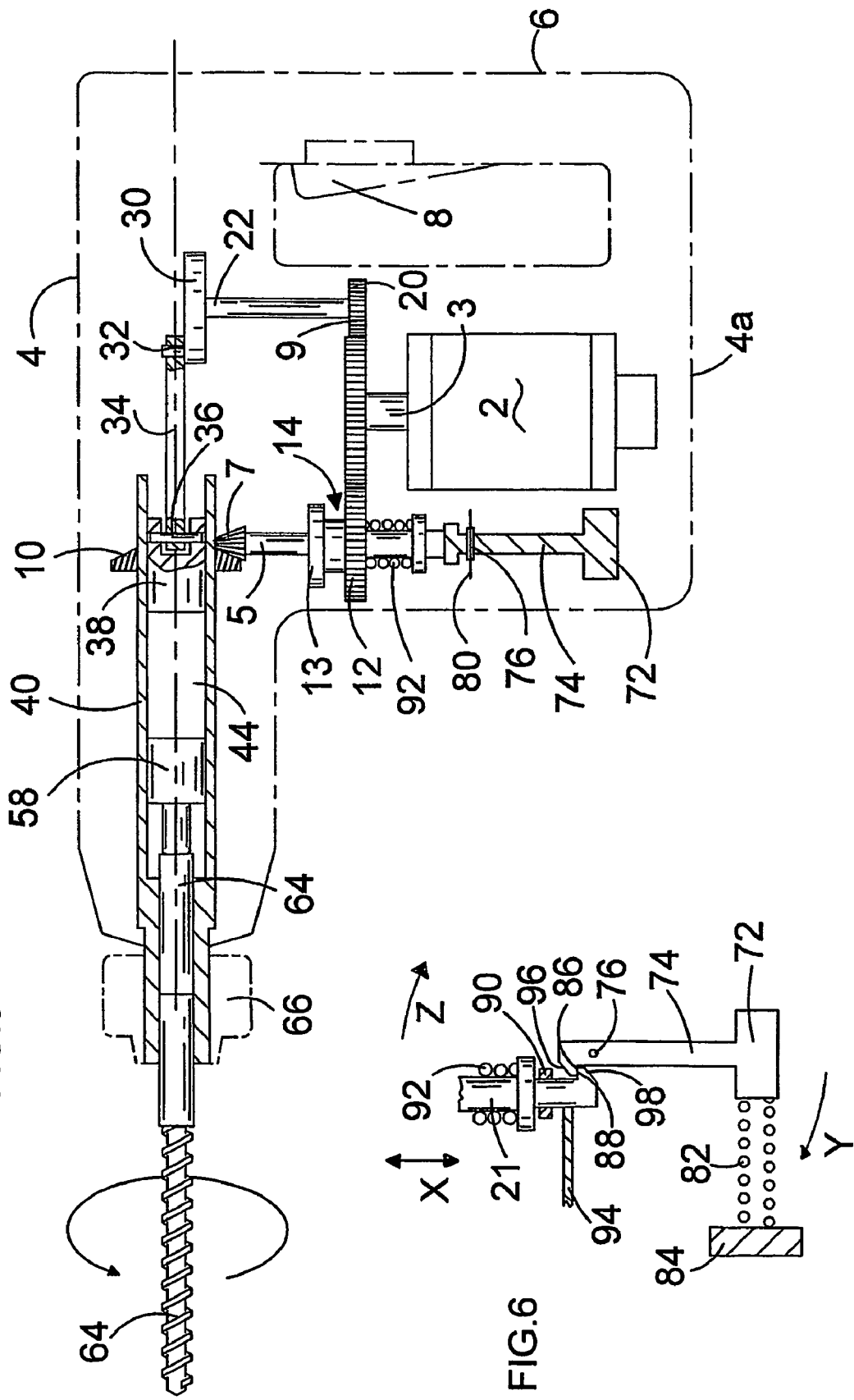
FIG. 5 shows a longitudinal cross-section through a rotary hammer of a further embodiment of the present invention.
FIG. 6 shows a transverse cross-section of a mechanical blocking event detection arrangement of the rotary hammer of FIG. 5.

The rotary hammer shown in FIG. 5 is similar to that of FIG. 1, except that it has a purely mechanical arrangement for detecting blocking events, as opposed to an electromechanical arrangement for detecting blocking events. Instead of the accelerometer (16), micro-controller (17), circuit (18) and electromagnet (19) of the FIG. 1 embodiment, the hammer of FIG. 5 has the mechanical arrangement shown, from the front, in FIG. 6.

The arrangement for detecting blocking events shown in FIGS. 5 and 6 comprises an inertial mass (72) which is formed at the lower end of a lever (74), the upper end of which lever (74) is pivotally mounted with respect to the hammer housing, via pivot pin (76) so that the mass (72) and lever (74) are pivotal about an axis (80) extending parallel to the spindle axis (78). The mass is connected via a spring (82) to a mounting block (84) which. mounting block is rigidly mounted with respect to the hammer housing (4). A first end of the spring (82) is fixed to the mounting block (84) and a second end of the spring (82) is fixed to the mass (72). As the hammer is operated, the mass vibrates, and so pivots about the pivot pin (76) due to the vibrations occurring from the operation of the hammer. The spring (82) is arranged to damp the vibration of the mass (72) and so minimise the extent of the pivoting of the mass (72) about the pivot pin (76) during normal operation of the hammer. The upper end of the lever (74), above the pivot pin (76) is formed with a latching ledge (86), which during normal operation of the hammer engages with a facing latching ledge (88) formed at the lower end of an actuating shaft (21) of a clutch arrangement (14), discussed below in relation to FIGS. 7 and 8. The actuating shaft (21) of the clutch arrangement (14) is slideably mounted for movement in the direction of arrow (X) within components of the clutch and within a bushing (90). The actuating shaft (21) is biased by a strong spring (92), upwards, in the direction of the clutch arrangement (14).

During normal operating of the hammer, the pivoting movement of the mass (72) about the pivot pin (76) is limited by the damping action of the spring (82). However, when a blocking event occurs, the bit (68) becomes rotationally fixed in the material being worked and the hammer housing is rotatingiy driven about the bit (68) by the motor (2) via the spindle rotary drive arrangement. This causes the lower part of the hammer housing (4a) to rotate, with a very high acceleration, about the spindle axis (78) so that said lower part moves in a direction out of the paper of FIG. 5. The inertia of the mass (72) causes the mass to pivot about the pin (76) in a direction into the paper in FIG. 5, ie. in the direction of the arrow (Y) in FIG. 6, so as to compress the spring (82). The upper end of the lever (74) above the pin (76) pivots in the direction of the arrow (Z) with respect to the pivot pin (76), which causes the latching ledge (86) of the lever (74) to disengage the latching ledge (88) of the actuating shaft (21). The strong spring (92) is then able to urge the actuating shaft (21) to move upwardly to cause the clutch (14) to disengage, as is described below in relation to FIGS. 7 and 8, and so rotary drive from the motor (2) to the spindle (40) is cut off and the housing (4) is not rotatingly driven any further.

A lever (94) is provided on the actuating shaft (21) to re-set the blocking event detection arrangement of FIG. 6 after the rotary drive has been cut off in response to the detection of a blocking event. The lever (94) can extend outside of the hammer housing (4) or can engage a sliding knob actuable from the outside of the housing (4), so that the lever (94) and thus the actuating shaft can be pulled downwardly. As the shaft (21) is pulled downwardly, against the force of the strong spring (92), chamfered outer edges (96, 98) formed on the actuating shaft (21) and the upper end of the lever (74) engage to pivot the lever (74) about the pivot pin (76) in the direction of the arrow (Z) against the biasing force of the spring (82) so as to re-engage the latching ledges (86, 88) of the actuating shaft (21) and the lever (74).

Figure 7:
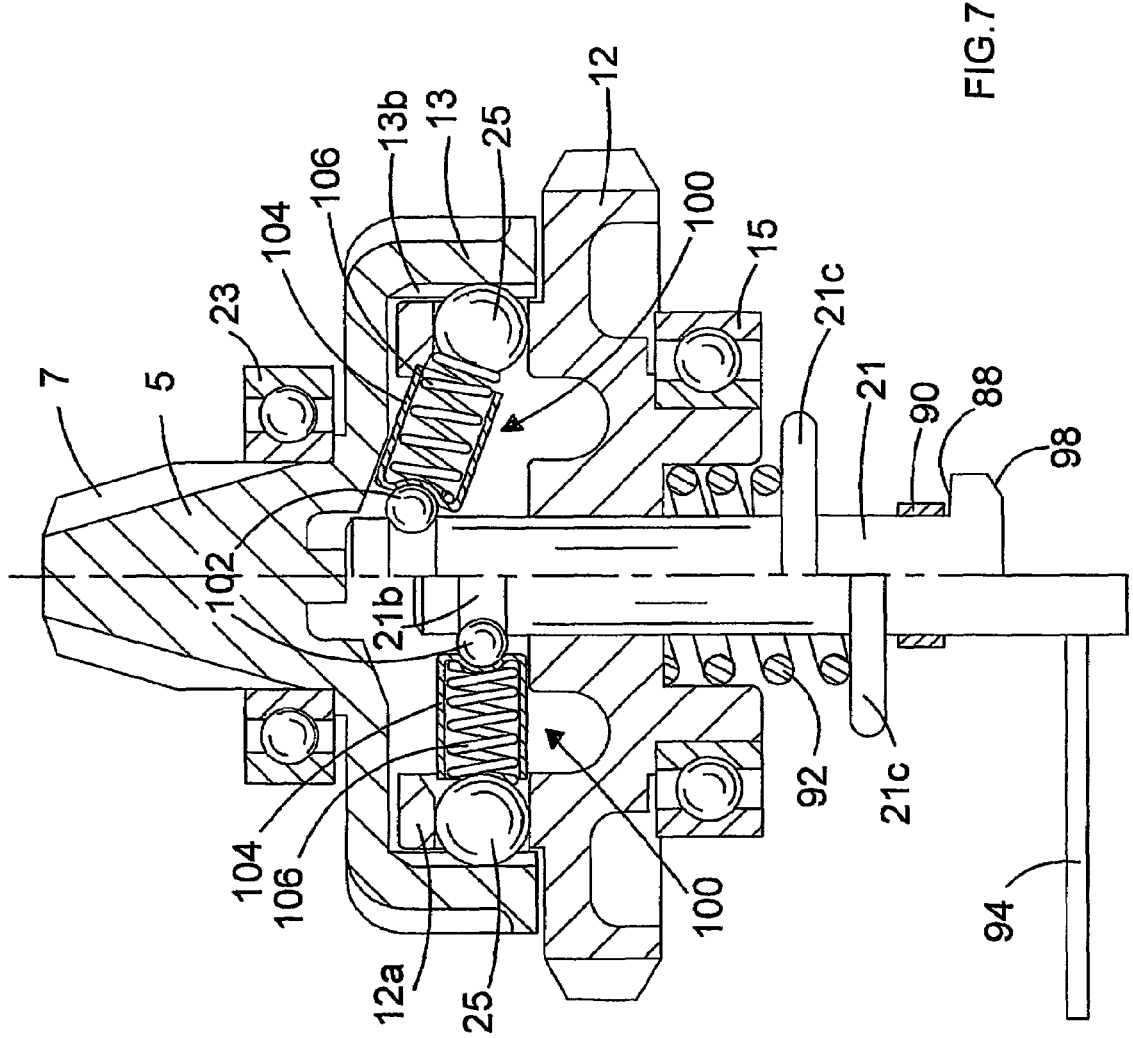
FIG. 7 shows a longitudinal cross-section through a further embodiment of an overload clutch of the rotary hammer of FIG. 5.

An overload clutch arrangement suitable for use in the hammer of FIG. 5 is shown in FIG. 7. The driving gear (12), driven gear (13) and actuating shaft (21) are mounted in the housing as described for the FIG. 2 embodiment, with an extra guiding bushing (90) for slideably guiding the actuating shaft (21) as described above in relation to FIGS. 5 and 6. Rotary drive is transmitted between the driving gear (12) and the driven gear (13) of the overload clutch arrangement (14) via a plurality of locking balls (25). The driving gear (12) is formed with a cylindrical sleeve portion (12a) which extends within a cylindrical sleeve portion (13a) of the driven gear (13). The locking balls (25) are mounted in corresponding holes formed through the cylindrical sleeve portion (12a) so as to be shiftable in a radial direction. The actuating shaft (21) has an reduced diameter portion (21b) which is slideable within the cylindrical sleeve portion (12a) of the driving gear (12). A plurality of spring elements (100) are circumferentially spaced around the actuating shaft (21) and are pivotably mounted with respect to the reduced diameter portion (21 b) via balls (102). Each spring element comprises a helical spring (106) mounted within a guide jacket (104) and extends radially with respect to the actuating shaft (21) between the balls (102) and the locking balls (25). Each ball (102) is received within an associated pocket in the reduced diameter portion (21b) and a pocket formed at the radially inner end of the resilient jacket (104) of an associated spring element (100). This enables the locking elements (100) to pivot between the positions shown on the left hand side and the right hand side of FIG. 7. In the position shown in the left hand side of FIG. 7, the spring elements (100) bias the locking balls (25) into a radially outward position in which the locking balls engage a corresponding set of pockets (13b) formed in the radially inwardly facing surface of the cylindrical sleeve portion (13a) of the driven gear. The pockets (13b) are separated by a set of sloped ridges. When the locking balls (25) engage the pockets (13b) rotary drive is transmitted between the driving gear (12) and the driven gear (13) and rotational drive is transmitted via the spindle drive shaft (5) to the spindle (40).

When the reduced diameter portion (21b) of the actuating shaft (21) is the position shown in the left hand side of FIG. 7, the clutch arrangement (14) acts as an overload clutch. Below a predetermined torque, the spring elements (100) bias the locking balls (25) into engagement with the pockets (13b) in the driven gear (13) to thereby transmit rotation from the driving gear (12) to the driven gear (13). Thus, rotary drive is transmitted to the spindle (40) via the spindle drive shaft (5). However, above the predetermined torque, the biasing force from the spring elements (100) become insufficient to bias the locking balls (25) into the pockets (13b) in the driven gear (13) and the balls can move radially inwardly to ride up the slopes and over the ridges between the pockets (13b). Thus, the driven gear (13) rotates with respect to the driving gear (12) and rotary drive to the spindle drive shaft (5) and thus to the spindle (40) is cut-off.

The overload clutch arrangement of FIG. 7, also acts to cut-off rotary drive to the spindle (40) when a blocking event is detected. As described above in relation to FIGS. 5 and 6, when a blocking event occurs, the inertial mass (72) pivots in the direction (Y) causing the upper end of the lever (74) to pivot in direction (Z) thus causing the latching ledges (86, 88) on the lever (74) and actuating shaft (21) to disengage. The strong spring (92), which is axially fixed at its lower end to an increased diameter portion (21c) and is axially fixed at its upper end to the driving gear (12), acts to pull the increased diameter portion (21c) of the actuating shaft, upwardly and so pulls the actuating shaft upwardly into the position shown on the right hand side of FIG. 7. This movement of the actuating shaft (21) moves the decreased diameter portion (21b) of the actuating shaft (21) upwardly and causes the spring elements to pivot about the pivot balls (102). This pivoting of the spring elements (100) leads to an extension of the springs (104) which reduces the biasing forces from the spring elements (100) on the locking balls (25). In this way, the radially outwardly biasing force on the locking balls (25) from the spring elements (100) is significantly reduced and the locking balls move radially inwardly, out of the pockets (13a) in the cylindrical sleeve (13a) of the driven gear (13). Thus, rotary drive to the driven gear (13) and so to the spindle (40) via the spindle drive shaft (5) is cut off. Accordingly, as soon as the latching ledges (86, 88) of the lever (74) and clutch actuating shaft (21) are disengaged no further rotary drive is transmitted via the clutch arrangement (14) to the spindle (40). In this way the potentially dangerous consequences of a blocking event are avoided.

Figure 8:
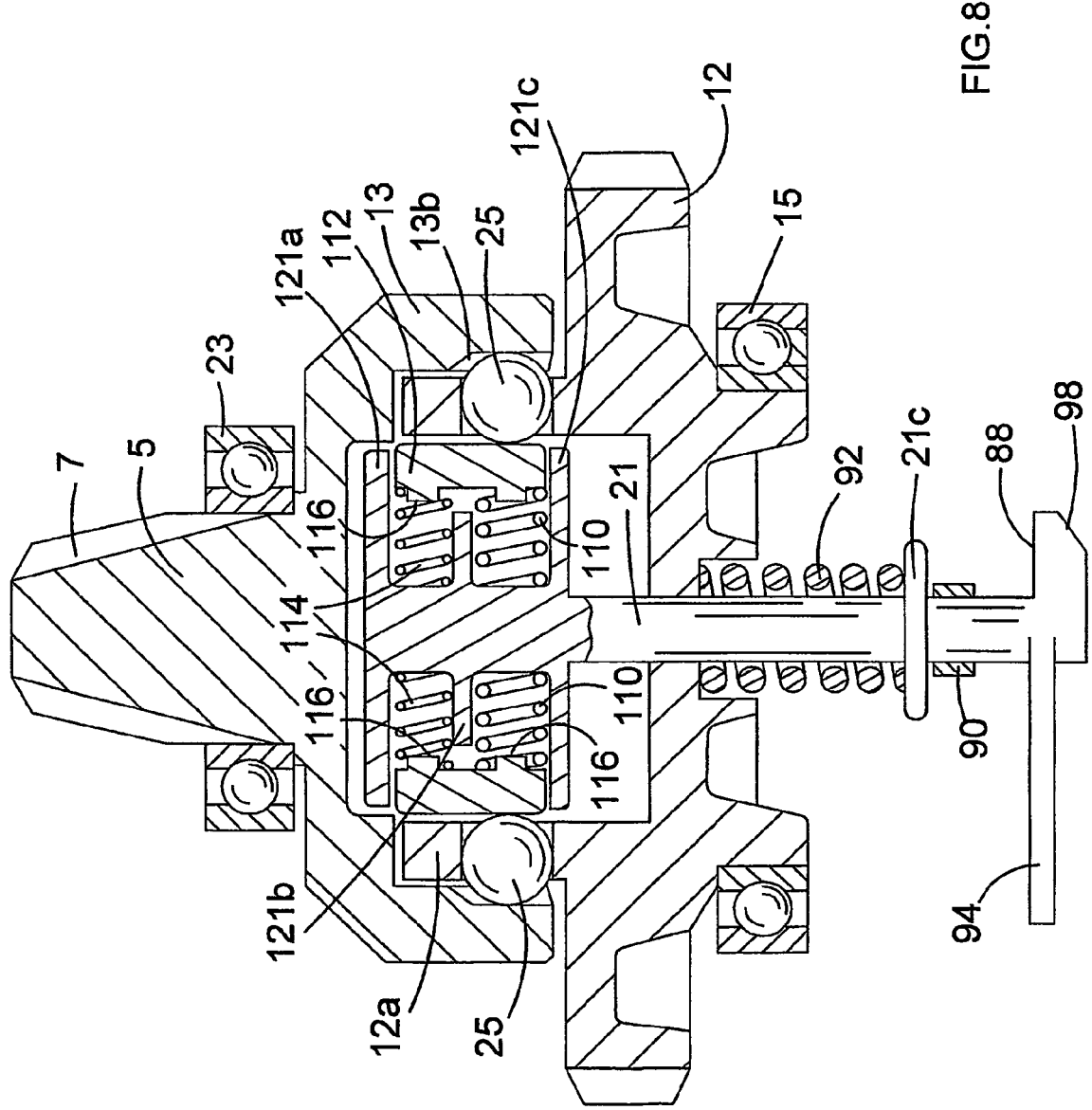
FIG. 8 shows a longitudinal cross-section through a further embodiment of the overload clutch of the rotary hammer of FIG. 5.

A second embodiment of an overload clutch arrangement suitable for use in the hammer of FIG. 5 is shown in FIG. 8. The driving gear (12), driven gear (13) and actuating shaft (21) are mounted in the housing as described for the FIG. 2 embodiment, with an extra guiding bushing (90) for slideably guiding the actuating shaft (21) as described above in relation to FIGS. 5 and 6. Rotary drive is transmitted between the driving gear (12) and the driven gear (13) of the overload clutch arrangement (14) via a plurality of locking balls (25). The driving gear (12) is formed with a cylindrical sleeve portion (12a) which extends within a cylindrical sleeve portion (13a) of the driven gear (13). The locking balls (25) are mounted in corresponding holes formed through the cylindrical sleeve portion (12a) so as to be shiftable in a radial direction. The actuating shaft (21) is formed with three increased diameter annulae (121a to 121c), the middle of which (121b) is of reduced diameter, as compared to the others. The annulae (121a to c) are slideable within the cylindrical sleeve portion (12a) of the driving gear (12). A first plurality of springs (110) are circumferentially spaced around the actuating shaft (21) and extend radially with respect to the actuating shaft (21) between the lower two annulae (121c and 121b) from the actuating shaft to an associated guide element (112). A second plurality of springs (114) are circumferentially spaced around the actuating shaft (21) and extend radially with respect to the actuating shaft (21) between the upper two annulae (121a and 121b) from the actuating shaft to the associated guide element (112). The radially outer end of each spring is mounted around an associated radially inwardly extending peg (116) formed on the associated guide element (112). Each guide element is formed with two pegs (116), an upper peg for engaging the end of one of the springs (114) and a lower peg for engaging the end of one of the springs (110) directly below said one of the springs (114). The first plurality of springs (110) exert a weaker radially outward biasing force than the second plurality of springs (114). Depending on the axial position of the actuating shaft (21), either the strong springs (114) or the weak springs (110) bias the locking balls (25) radially outwardly via the guide elements (112).

When the latching ledges (86, 88) are engaged and the spring (92) is extended the annulus (121c) is moved downwardly from its position in FIG. 8 and abuts the base of the driving gear sleeve (12). In this position the strong springs (114) are radially inwardly of the locking balls (25) and the clutch arrangement (14) acts as an overload clutch. Below a predetermined torque, the strong springs (114) bias the locking balls (25) into engagement with the pockets (13b) in the driven gear (13) to thereby transmit rotation from the driving gear (12) to the driven gear (13). Thus, rotary drive is transmitted to the spindle (40) via the spindle drive shaft (5). However, above the predetermined torque, the biasing force from the springs (114) become insufficient to bias the locking balls (25) into the pockets (13b) in the driven gear (13) and each guide element (112) pivots inwardly and the balls can move radially inwardly to ride up the slopes and over the ridges between the pockets (13b). Thus, the driven gear (13) rotates with respect to the driving gear (12) and rotary drive to the spindle drive shaft (5) and thus to the spindle (40) is cut-off.

The overload clutch arrangement of FIG. 8, also acts to cut-off rotary drive to the spindle (40) when a blocking event is detected. As described above in relation to FIGS. 5 and 6, when a blocking event occurs, the inertial mass (72) pivots in the direction (Y) causing the upper end of the lever (74) to pivot in direction (Z) thus causing the latching ledges (86, 88) on the lever (74) and actuating shaft (21) to disengage. The strong spring (92), which is axially fixed at its lower end to an increased diameter portion (21c) and is axially fixed at its upper end to the driving gear (12), acts to pull the increased diameter portion (21c) of the actuating shaft, upwardly and so pulls the actuating shaft upwardly into the position shown in FIG. 8. This movement of the actuating shaft (21) moves the weaker springs (110) radially inwardly of the locking balls (25). In this way, the radially outwardly biasing force on the locking balls (25) from the springs (110) is significantly reduced, as compared from the biasing force from the springs (114) and the locking balls move radially inwardly, out of the pockets (13a) in the cylindrical sleeve (13a) of the driven gear (13). Thus, rotary drive to the driven gear (13) and so to the spindle (40) via the spindle drive shaft (5) is cut off. Accordingly, as soon as the latching ledges (86, 88) of the lever (74) and clutch actuating shaft (21) are disengaged no further rotary drive is transmitted via the clutch arrangement (14) to the spindle (40). In this way the potentially dangerous consequences of a blocking event are avoided.

It should be noted that with modification to the actuating shaft (21) the clutch arrangements of FIGS. 2 and 3 are suitable for use in the hammer of FIG. 5 and that the clutch arrangements of FIGS. 7 and 8 are suitable for use in the hammer of FIG. 1.

Figure 9:
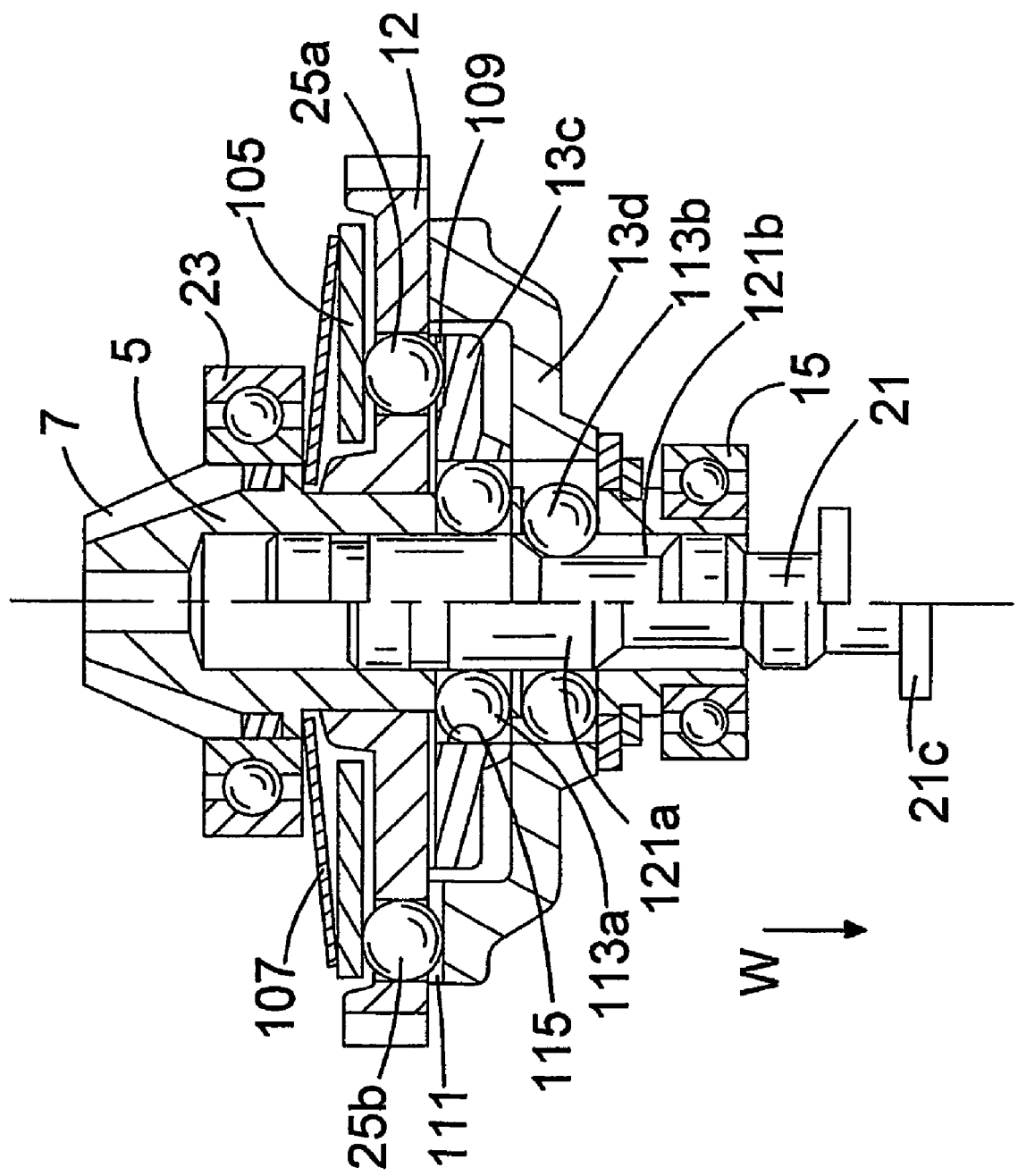
FIG. 9 shows a longitudinal cross-section through a further embodiment of an overload clutch suitable for use in the rotary hammer of FIGS. 1 or 5.
Figure 10:
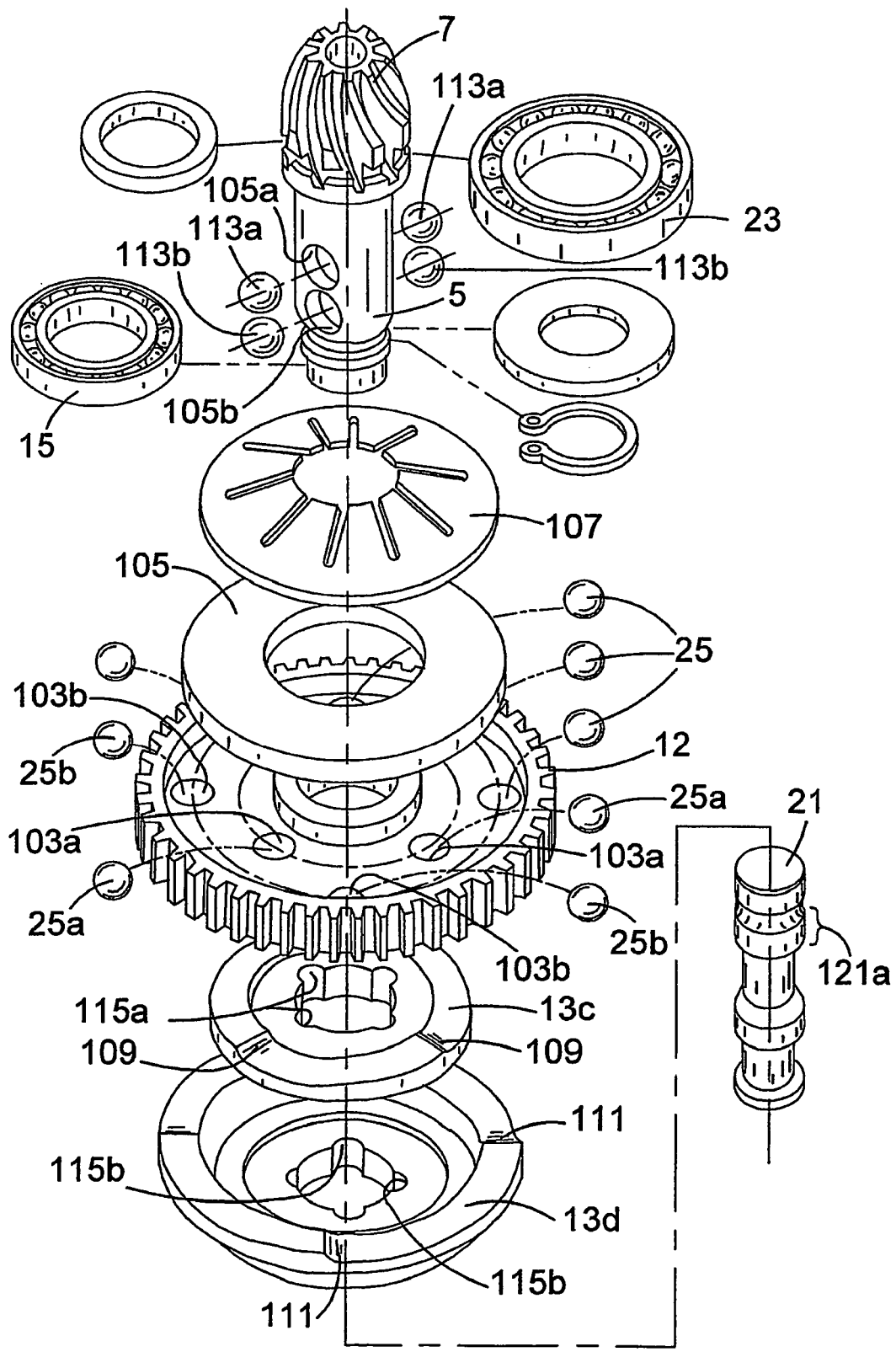
FIG. 10 shows a broken apart perspective view of the components of the overload clutch of FIG. 10.

FIGS. 9 and 10 show a further embodiment of a clutch arrangement suitable for use in the hammer of FIG. 1, if a lower portion of the actuating shaft (21) is made of a magnetic element. The FIG. 9 and 10 embodiment is also suitable for use in the arrangement of FIG. 5, if a spring arrangement is added for biasing the actuating shaft into an upper position.

The drive shaft (5) is formed with a pinion (7) at its upper end for meshing engagement with spindle drive gear (10). The shaft is rotatably mounted within the housing via bearings (23) and (15). The drive shaft (5) is hollow and the actuating shaft (21) is mounted within the drive shaft so as to be axially slideable within the drive shaft (5), with the lower end of the actuating shaft extending beyond the end of the drive shaft (5) remote from the pinion (7). The driving gear (12) is rotatably mounted on the drive shaft (5).

A first small diameter driven gear (13c) is mounted on the drive shaft (5) for selective rotation therewith, depending on the position of the actuating shaft (21). A first set of clutch balls (25a) are located within an associated set of through holes (103a) in the driving gear (12), which through holes are radially inwardly of a second set of through holes (103b). A conical spring (107) biases the clutch balls (25) axially downwardly, towards the driven gears (13c, 13d) via a washer (105). The spring extends from its radially inner end, which bears against a shoulder formed on the drive shaft (5) to a radially outer end which bears against the washer (105). The washer (105) is located with a cooperating annular recess formed in the upper side of the driving gear (12). The spring (107) biases each of the first set of four clutch balls (25a) into one of a set of four pockets (109) formed in the upper surface of the small diameter driven gear (13c). In this way, below a first predetermined torque, the first set of clutch balls (25a) transmit rotatary drive from the driving gear to the small diameter driven gear (13c). Above the first predetermined torque, the first set of clutch balls (25a) will ride out and over the pockets (109) formed in the small diameter driven gear (13c) and so will cut off drive between the driving gear (12) and the small diameter driven gear (13c). The rotary drive from the small diameter driven gear (13c) can be transmitted to the drive shaft (5) depending on the position of the actuating shaft (21), as is described below.

A first pair of drive balls (113a) are located within an associated pair of upper holes (105a) in the drive shaft. The drive balls are engageable with two of a set of four drive pockets (115a) formed in the radially inner edge of the small diameter driven gear (13c), to rotatingly drive the drive shaft (5) when an increased diameter portion (121a) is radially inwardly of the drive balls (113a) and so pushes the drive balls (113a) into a radially outward position. When a reduced diameter portion (121b) of the actuating shaft (21) is radially inwardly of the drive balls (113a) the drive balls can move radially inwardly and out of engagement with the drive pockets (115a) of the small diameter driven gear (13c) so that no rotary drive can be transmitted to the drive shaft (5).

A second large diameter driven gear (13d) is mounted on the drive shaft (5) for selective rotation therewith, depending on the position of the actuating shaft (21). The second large diameter driven gear is located on the drive shaft (5) below and extends radially outwardly of the small diameter driven gear (13a). A peripheral rim of the large diameter driven gear (13d) extends axially towards the driving gear (12) around the periphery of the small diameter driven gear (13c). A second set of clutch balls (25b) are located within an associated set of through holes (103b) in the driving gear (12), which through holes are radially outwardly of the first set of through holes (103a). The conical spring (107) biases each of the second set of four clutch balls (25a), via the washer (105), into one of a set of four pockets (111) formed in the upper surface of the peripheral rim of the large diameter driven gear (13d). In this way, below a second predetermined torque, the second set of clutch balls (25b) transmit rotatary drive from the driving gear to the large diameter driven gear (13b). Above the second predetermined torque, the second set of clutch balls (25b) will ride out and over the pockets (111) formed in the large diameter driven gear (13d) and so will cut off drive between the driving gear (12) and the large diameter driven gear (13d). The second predetermined torque will be higher than the first due to the greater radial distance between the axis of the drive shaft (5) and the second set of clutch balls (25b) than the radial distance between the axis of the drive shaft and the first set of clutch balls (25a). The rotary drive from the large diameter driven gear (13d) can be transmitted to the drive shaft (5) depending on the position of the actuating shaft (21), as is described below.

A second pair of drive balls (113b) are located within an associated pair of lower holes (105b) in the drive shaft. The drive balls are engageable with two of a set of four drive pockets (115b) formed in the radially inner edge of the large diameter driven gear (13d), to rotatingly drive the drive shaft (5) when an increased diameter portion (121a) of the actuating shaft is radially inwardly of the drive balls (113b) and so pushes the drive balls (113b) into a radially outward position. When a reduced diameter portion (121b) of the actuating shaft (21) is radially inwardly of the drive balls (113b) the drive balls can move radially inwardly and out of engagement with the drive pockets (115b) of the large diameter driven gear (13d) so that no rotary drive can be transmitted to the drive shaft (5).

In a first position of the actuating shaft (21) of the clutch of FIGS. 9 and 10 shown on the right hand side of FIG. 9, only the small diameter driven gear (13c) can rotatingly drive the drive shaft (5) via the first set of drive balls (113a). The drive balls (113a) in the first position as shown in the right hand side of FIG. 9 are urged into engagement with the drive pockets (115a) of the small diameter driven gear (13c). This is because the increased diameter portion (121a) of the actuating shaft is radially inward of the first set of drive balls (113) and so urge the drive balls radially outwardly. The second set of drive balls (113b) are able to move radially inwardly into the reduced diameter portion (121b) of the actuating shaft (21) and out of the drive pockets (115b) in the large diameter driven gear (13d), and so no rotary drive can be transmitted between the large diameter driven gear (13d) and the drive shaft (5). In this first position, of the clutch of FIGS. 9 and 10, below a first relatively low predetermined torque, the first set of clutch balls (25a) transmit rotatary drive from the driving gear to the small diameter driven gear (13c). Above the first predetermined torque, the first set of clutch balls (25a) will ride out and over the pockets (109) formed in the small diameter driven gear (13c) and so will cut off drive between the driving gear (12) and the small diameter driven gear (13c). Accordingly, in the first position, the clutch arrangement of FIGS. 9 and 10 acts as an overload clutch which slips at a first relatively low predetermined torque.

In a second position of the actuating shaft (21) of the clutch of FIGS. 9 and 10 shown on the left hand side of FIG. 9, both the small diameter driven gear (13c) and the large diameter driving gear (13d) can rotatingly drive the drive shaft (5) via the first and second sets of drive balls (113a, 113b). The drive balls (113a, 113b) in the second position as shown in the left hand side of FIG. 9 are urged into engagement with the drive pockets (115a, 115b) of the small diameter driven gear (13c) and of the large diameter driven gear (13d). This is because the increased diameter portion (121a) of the actuating shaft is radially inward of the both sets of drive balls (113a, 113b) and so urge both sets of drive balls radially outwardly. In this second position, of the clutch of FIGS. 9 and 10, below a second predetermined torque, higher than the first predetermined torque, each sets of clutch balls (25a, 25b) transmit rotatary drive from the driving gear (12) to their associated driven gear (13c, 13d). Above the second predetermined torque, the clutch balls (25a, 25b) will ride out and over the pockets (109, 111) formed in the associated driven gears (13c, 13d) and so will cut off drive between the driving gear (12) and the associated driven gears (13c, 13d). Accordingly, in the second position, the clutch arrangement of FIGS. 9 and 10 acts as an overload clutch which slips at a second predetermined torque, which is higher than the first.

Figure 11A:
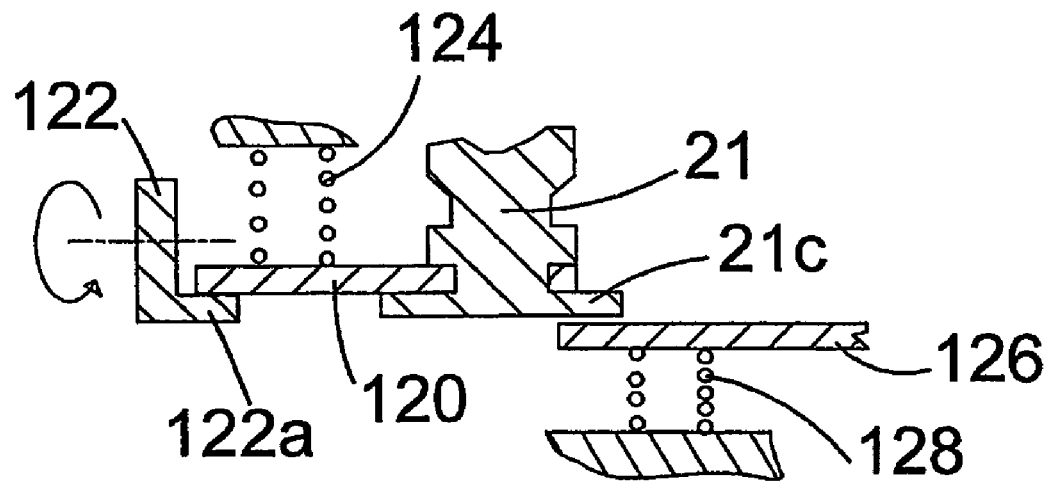
FIG. 11 shows a fourth embodiment of an overload clutch suitable for use in the rotary hammer of FIGS. 1 or 5.

To move between the first and second position of the clutch of FIGS. 9 and 10 the actuating shaft is moved downwardly in the direction of arrow (W). This can be facilitated, for example as is shown in FIG. 11a, by connecting the lower end of the actuating shaft (21c) to a linkage (120), which linkage is operated via a knob (122) actuatable by a user of the hammer to slideably move the actuating shaft (21) within the drive shaft (5) adjust the slipping torque of the overload clutch between the first and second predetermined torques. In the arrangement of FIG. 11a, an eccentric pin (122a) acts to pull the linkage (120) upwardly and to thereby pull the actuating shaft (21) upwardly from its position in FIG. 11a, against the biasing force of a spring (124) on rotation of the knob (122) out of the position shown in FIG. 11a. On movement of the knob (122) back into the position shown in FIG. 11a, the spring (124) returns the linkage and thus the actuating shaft to the position shown in FIG. 11a. The FIG. 11a position would be the higher torque position shown in the left hand side of FIG. 9 and the linkage (120) and actuating shaft (21) would be pulled upwardly out of the FIG. 11a position into the lower torque position shown in the right hand side of FIG. 9. Alternatively, the lower end. of the actuating shaft (21) could be connected directly to the knob.

The clutch arrangement of FIGS. 9 and 10 has a third position in which the reduced diameter portion (21b) of the actuating shaft is radially inwardly of both sets of drive balls (113a, 113b). Thus, the drive balls are able to move radially inwardly and out of engagement with the drive pockets (115a, 115b) of the driven gears (13c, 13d) and no rotary drive can be transmitted between the driven gears (13c, 13d) and the drive shaft. In this third position, in which the actuating shaft (21) is moved upwardly, in the opposite direction to the arrow (W) from the low torque position shown in the right hand side of FIG. 9, the rotary drive to the drive shaft (5) and thus to the spindle (40) is cut off.

Figure 11B:
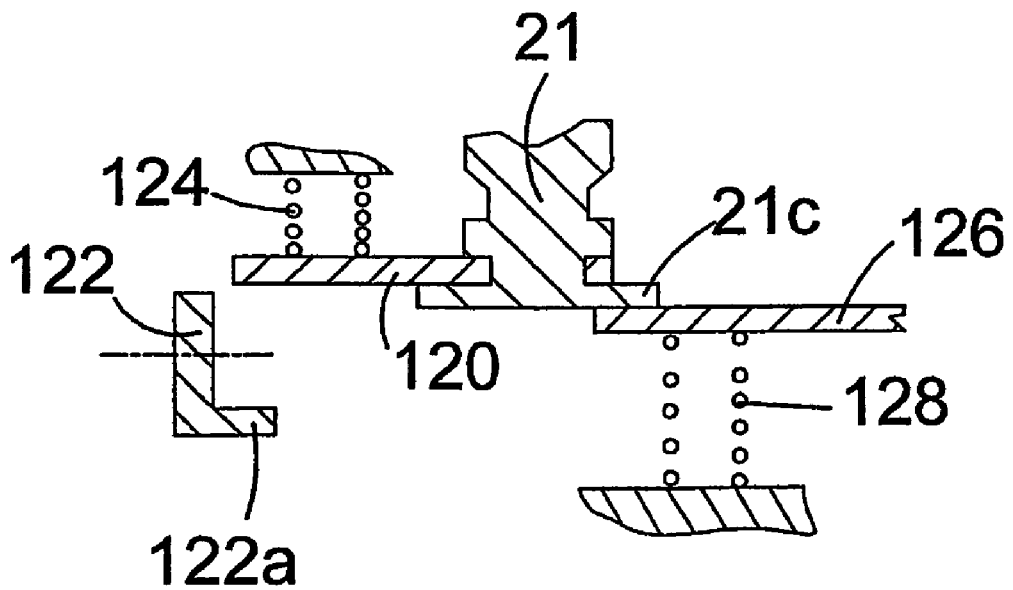

The clutch arrangement of FIG. 9 and 10 can be moved into the third position via a mode change linkage (126), shown in FIGS. 11a and 11b. The mode change linkage can be actuated between it positions in FIGS. 11a and 11b by a mode change knob actuable by a user of the hammer. In the FIG. 11a position the mode change linkage (126) is out of engagement with the actuating shaft (21), this position would be a drilling only or a rotary hammering position of the mode change linkage. Thus the linkage (126), maintained in the position of FIG. 11a by a spring (128) does not interfere with the arrangement for altering the predetermined torque, discussed above in relation to FIG. 11a, in the drilling and/or rotary hammering modes. In the FIG. 11b position, the linkage (126) has been moved, against the biasing force of the spring (128) by a mode change knob into its hammering only mode position, in which the linkage (126) engages the lower portion (21c) of the actuating shaft (21) to move it upwardly from the position shown in the right hand side of FIG. 9. This cuts off drive form the driving gear (12) to the drive shaft (5) and so there is no rotational output of the spindle (40) or the bit (68) mounted therein. The linkage arrangement (120, 122) for switching between low torque and high torque position in rotary modes of the hammer does not interfere with the operation of the mode change linkage (126) to move the hammer into its non-rotary mode. On return of the mode change knob to a rotary mode position the biasing force of the spring (128) will return the mode change linkage (126) to its position of FIG. 11a.

The third position of the clutch arrangement can also be used to cut off rotary drive to the spindle (40) when a blocking event is detected. If the blocking event is detected electronically, then an electromagnet surrounding the lower portion of the actuating shaft (21) can be energised to react against a magnetic element fitted to the lower portion of the actuating shaft and to move the actuating shaft upwardly into its third position against the biasing forces of the springs (124) and (128). It should be noted that neither the arrangement (120, 122) for switching between the first and second positions, not the mode change linkage arrangement (126, 128) for switching to the third position hinder the movement of the actuating shaft to its upper position in response to the energisation of the electromagnet.

As an alternative to an electromagnet, the mechanical arrangement for detecting blocking events of FIG. 6, could be used in conjunction with the clutch arrangement of FIGS. 9 and 10. Here the latching ledge (86) of the linkage (74) would engage the lower portion (21*c*) of the actuating shaft (21) and the shaft would be biased to move upwardly into the third position should the latching ledge and lower portion (21*c*) become disengaged in the event of a blocking event.

Figure 12:
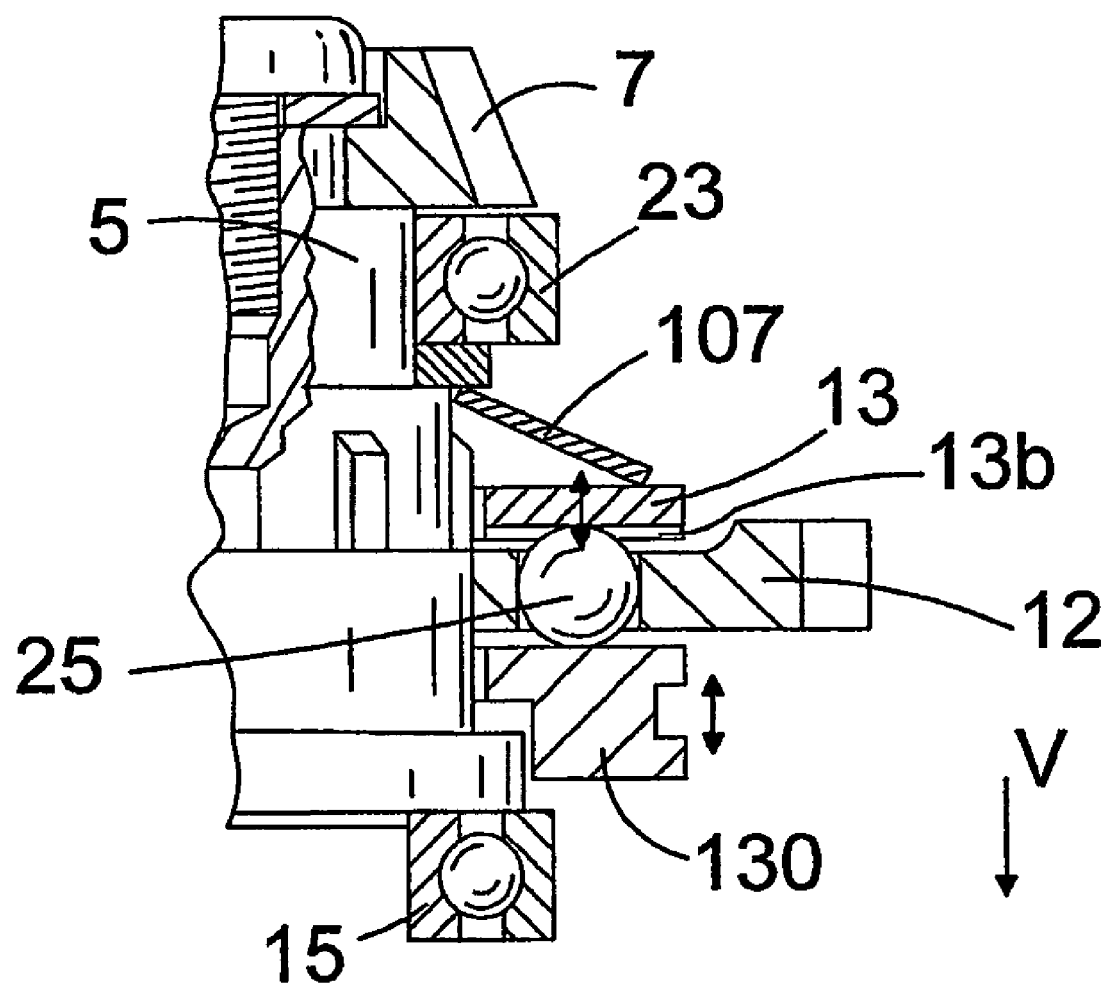
FIG. 12 is a cross sectional front elevation view of an overload clutch of a further embodiment of the invention.

FIG. 12 shows an additional design of overload clutch (14) which can be used for selectively cutting of rotary drive between the driving gear (12) and the driven gear (13) for mode change or in response to a blocking event The driving gear (12) is rotatably mounted on the drive shaft (5) and has clutch balls (25) mounted in holes extending axially through the driving gear. A driven gear (13) is non-rotatably mounted on the drive shaft (5) and is formed with a set of pockets (13*b*) on its face facing the driving gear (12) for receiving the clutch balls (25). A conical spring (107) urges the driven gear (13) towards the driving gear (12). An actuating ring (130) is located below the driving gear (12) and in a first position shown on FIG. 12, the ring (130) pushes the clutch balls (25) into engagement with the pockets (13*b*) in the driven gear (13). The actuating ring (130) can be moved downwardly in direction (V) into a position in which it no longer urges the clutch balls into engagement with the pockets (13*b*) in the driven gear (13).

In the position shown in FIG. 12 the clutch acts as an overload clutch. Below a predetermined torque, the conical spring (107) biases the clutch balls (25) into engagement with the pockets (13*b*) in the driven gear (13) to thereby transmit rotation from the driving gear (12) to the driven gear (13). Thus, rotary drive is transmitted to the spindle (40) via the spindle drive shaft (5). However, above the predetermined torque, the biasing force from the conical spring (107) becomes insufficient to bias the clutch balls (25) into the pockets (13*b*) in the driven gear (13) and the driven gear (13) can move axially against the force of the spring (107) to ride over clutch balls (25). Thus, the driven gear (13) rotates with respect to the driving gear (12) and rotary drive to the spindle drive shaft (5) and thus to the spindle (40) is cut-off. When the actuating ring is moved to the second position no rotary drive can be transmitted between the driving gear (12) and the driven gear (13) because the clutch balls (25) cannot engage the pockets (13*b*) in the driven fear (13). Therefore, on detection of a blocking event the guide ring is moved to the second position to disengage rotary drive. This can be done by mechanical or electromechanical means, as described above in relation to FIGS. 1, 5 and 6. Additionally or alternatively, the locking ring (130) can be moved to the second position by a mode change arrangement on switching to a non-rotary mode of the hammer.

Referring now to FIG. 13, a hammer of a further embodiment of the invention comprises an electric motor (2), a spindle drive train (4) and a crank drive arrangement (6) surrounded by a plastic housing (8). A rear handle (10) and a trigger switch arrangement (not shown) are fitted to the rear of the housing (8). An electric cable (not shown) extends through a cable guide and connects the motor (2) to an external electricity supply. Thus, when the cable is connected to the electricity supply and the trigger switch arrangement is depressed, the motor (2) is actuated to rotationally drive the armature of the motor (2).

A main driving gear (12) is press fitted onto a motor pinion (14) and has teeth which engage the teeth of a driving gear (16) of an overload clutch arrangement (18) to rotatingly drive the driving gear (16). The driving gear (16) rotatingly drives a bevel gear (20) of the overload clutch arrangement (18) when the torque transmitted between the two gears (16, 20) is below predetermined thresholds and if no blocking event is detected. The bevel gear (20) meshes with a beveled spindle drive gear (22) which beveled spindle drive gear (22) is rotatably mounted on a cylindrical hollow spindle (40) and can freely rotate about the spindle. The beveled spindle drive gear (22) rotatingly drives the spindle (40) via a rotary drive clutch described below. The overload clutch arrangement (18) is described in more detail below.

The teeth of the driving gear (12) also engage the teeth of a crank drive gear (24) to rotatingly drive the crank drive gear (24). The crank drive gear (24) is non-rotatably mounted on a crank drive spindle (26). A crank plate (30) is non-rotatably mounted at the end of the drive spindle (26) remote from the crank drive gear (24), which crank-plate (30) is formed with an eccentric bore for housing an eccentric crank pin (32). The crank pin (32) extends from the crank plate (30) into a bore at the rearward end of a con-rod or crank arm (34) so that the con-rod (34) can pivot about the crank pin (32). The opposite forward end of the con-rod (34) is formed with a bore through which extends a trunnion pin (36) so that the con-rod (34) can pivot about the trunnion pin. The trunnion pin (36) is fitted to the rear of a piston (38) by fitting the ends of the trunnion pin (36) into receiving bores formed in a pair of opposing arms (42), which arms extend to the rear of the piston (38). The piston (38) is reciprocally mounted in the cylindrical hollow spindle (40) so that it can reciprocate within the hollow spindle. An O-ring seal (44) is fitted in an annular recess formed in the periphery of the piston (38) so as to form an air tight seal between the piston (38) and the internal surface of the hollow spindle (40).

Thus, when the motor (2) is actuated, the armature pinion (14) rotatingly drives the main driving gear (12) and the main driving gear (12) rotatingly drives the crank drive spindle (26) via the crank drive gear (24). The drive spindle (26) rotatingly drives the crank plate (30) and the crank arm arrangement comprising the crank pin (32), the con-rod (34) and the trunnion pin (36) convert the rotational drive from the crank plate (30) to a reciprocating drive to the piston (38). In this way the piston (38) is reciprocatingly driven back and forth along the hollow spindle (40), when the motor (2) is actuated by depression of the trigger switch (not shown) on rear handle (10). The main driving gear (12) also drives the driving gear (16) of the clutch arrangement (18) which drives the bevel gear (20) of the clutch arrangement. The bevel gear (20) of the clutch arrangement rotatingly drives the spindle drive gear (22) and thus the spindle (40) when the spindle drive gear (22) is drivingly connected to the spindle (40). When the mechanism by which the spindle drive gear (22) is connected to the spindle (40) is connected, the hammer operates in a chisel and drill mode, and when it is disconnected, the hammer operates in a chisel mode only.

A two torque clutch of the clutch arrangement (18) of the hammer of FIG. 13 will now be described in more detail with reference to FIGS. 14 to 17.

The bevel gear (20) which forms part of the clutch arrangement (18) is integrally formed with a shaft (100) of circular cross section. The upper end of the shaft (100) is rotatably mounted within the housing (8) of the hammer via a bearing comprising an inner race (102) which is rigidly attached to the shaft (100), an outer race (104) which is rigidly attached to the housing and ball bearings (106) which allows the outer race (102) to freely rotate about the inner race (102). The bearing is located adjacent the underside of the bevel gear (20).

The driving gear (16) is rotatably mounted on the shaft (100) and can freely rotate about the shaft (100). The driving gear (16) abuts the underside of the inner race (102) of the bearing and is prevented from axially sliding away from (downwardly) by the rest of the clutch mechanism which is described in more detail below.

The driving gear (16) is so shaped that it surrounds a toroidal space, the space being surrounded by a flat bottom (108) which projects radially outwards from the shaft (100), an outer side wall (110) upon the outer surface of which are formed the teeth of the driving gear (16) and an inner side wall (112) which is adjacent the shaft (100).

Located within the toroidal space of the driving gear (12) adjacent the flat bottom (108) is a washer (114) which surrounds the inner wall 112 and shaft (100). Mounted on top of the washer (114) is belleville washer (116). The inner edge of the belleville washer is located under the inner race (102) of the bearing whilst the outer edge of the belleville washer abuts against the outer edge of the washer (114) adjacent the outer wall (110) of the driving gear (16). The driving gear (112) is held axially on the longitudinal axis of the shaft (100) in relation to the belleville washer so that the belleville washer (116) is compressed causing it to impart a downward biasing force onto the washer (114) towards the flat bottom (108) of the driving gear (16).

Formed in the flat bottom (108) of the driving gear (16) are two sets of holes; a first inner set (118) of five, each located equidistantly from the longitudinally axis of the shaft in a radial direction and angularly from each other around the longitudinal axis of the shaft (100); a second outer set (120) of five, each located equidistantly from the longitudinal axis of the shaft in a radial direction and angularly from each other around the longitudinal axis of the shaft (100). The radial distance of the outer set (120) from the longitudinal axis of the shaft (100) is greater than that of the inner set (118).

A ball bearing (122) is located in each of the holes and abuts against the underside of the washer (114). The diameters of all the ball bearings (122) are the same, the diameter being greater than the thickness of the flat bottom (108) of the driving gear (16) thereby resulting either the top or bottom of the ball bearings (122) protruding beyond the upper or lower surfaces of the flat bottom (108) of the driving gear (16).

Mounted on the spindle (100) below and adjacent to the driving gear (16) is a first slip washer (124). The first slip washer (124) comprises a circular hole (123) with two splines (125) projecting into the hole (123) which, when the washer is mounted on the spindle (100), locate within two corresponding slots (127) formed in the spindle (100). As such, the first slip washer (124) is none rotatably mounted on the spindle, the spindle (100) rotating when the first slip washer (124) rotates.

Referring to FIGS. 16A to 16C, formed on one side of the first slip washer (124) around the periphery is a trough (126) with a U shaped cross section (see FIG. 16B). The circular trough (126) is separated into five sections (128), the depth of each section (128) of trough varying from a low point (129) to high point (131). Each section (128) of trough (126) is the same in shape as the other sections (128) of trough (126). The low point (129) of one section (128) of trough is adjacent to the high point (131) of the next section as shown in FIG. 16C. The two are connected via a ramp (134). When the slip washer (124) is mounted on the shaft (100), the side of the first slip washer (124) faces the driving gear (16). The diameter of the first slip washer (124) is less than that of the driving gear (16) and is such that, when the slip washer (124) is mounted on the shaft (100), the trough (126) faces the inner set of holes (118). The five sections (128) which form the trough (126) correspond to the five holes (118) which formed the innermost set of holes in the driving gear (16) so that, when the clutch (18) is assembled, one ball bearing (122) locates in each section (128) and trough (126).

Mounted on the spindle (100) below the first slip washer (124).is a second slip washer (140). The second slip washer (146) is dish shaped having an angled side wall (142) surrounding a flat base (144). When mounted on the spindle, the first slip washer (124) locates within the space surrounded by the side wall (142) and the flat base (144) surface as best seen in FIG. 14. The second slip washer (140) can freely rotate about the spindle (100). A rectangular slot (146) superimposed on a circular hole (147) is formed in the flat base (144) symmetrical about the axis of rotation of the second slip washer (140). Formed on the top of the angled side wall (142) is a flange (148) which projects radially outwards.

Referring to FIG. 17, formed on the top side of the radial flange (148), around the radial flange (148), is a trough (150) with a U shaped cross section which is similar in shape to that on the first slip washer (124). The circular trough (150) is separated into five sections (151), the depth of each section of trough varying from a low point (152) to a high point (154). Each section (151) of the trough (150) is the same in shape as the other sections of trough. The low point (152) of one section of trough is adjacent to the high point (154) of the next section. The two are connected via a ramp (156). When the second slip washer (140) is mounted on the shaft as shown, the side of the flange (148) with the trough (150) faces the driving gear (16). The diameter of the flange (150) is such that, when the second slip washer (140) is mounted on the shaft (100), the trough (150) faces the outer set of holes (120) in the driving gear (16). The five sections (151) which form the trough (150) correspond to the five holes (120) which form the outermost set of holes in the driving gear (16) so that, when the clutch is assembled, one ball bearing (122) locates in each section of the trough (150).

The size of the ramps (134) in the trough (126) of the first slip ring (124) is less than that of the size of the ramps (156) formed in the trough (150) of the second slip washer (140), the variation of the height of each section of trough in the first slip washer (124) from the low end (120) to the high end (131) being less than that of the variation of the height of each section of trough in the second slip washer from the low end (152) to the high end (154).

When the clutch is assembled, the ball bearings (122) in the innermost set of holes (118) in the driving gear (16) locate within the trough (126) of the first slip washer (124) (one ball bearing per section) and the ball bearings (122) in the outer most set of holes (120) in the driving gear (16) locate within the trough (150) of the second slip washer (140) (one ball bearing per section).

A circular clip (160) is rigidly mounted on the spindle (100) below the second slip washer (140) which holds the first and second slip washers (124, 140) together with the driving gear (16) against the underside of the bearing in a sandwich construction preventing axial displacement of the three along the spindle. Rotation of the circular clip results in rotation of the spindle (100).

The lower end of shaft (100) is rotatably mounted within the housing (8) of the hammer via a second bearing comprising an inner race (170) which is rigidly attached to the shaft (100), an outer race (172) which is rigidly attached to the housing (8) and ball bearings (174) which allows the outer race (174) to freely rotate about the inner race (170). The bearing is located adjacent the underside of the circular clip (160).

When the clutch is fully assembled and no rotary torque is being transferred through it, each of the ball bearings in the innermost holes (118) of the driving gear (16) locate in the lowest points (134) of the corresponding sections (128) of the trough in the first slip washer (124) as indicated by the dashed line (180). When the ball bearings (122) are located within the lowest points (134) of the sections (128) of the trough (126), the tops of the ball bearings (122), which are adjacent to the washer (114), are flush with the surface facing the washer (114) of the flat bottom (108) of the driving gear (16). The ball bearings (122) locate in the lowest points (134) due to the biasing force of the belleville washer (116) which is biasing the washer (114) in a downward direction which in turn pushed the ball bearings (122) to their lowest positions.

Similarly, when the clutch is fully assembled and no rotary torque is being transferred through it, each of the ball bearings (122) in the outermost holes (120) of the driving gear (16) locate in the lowest points (156) of the corresponding sections (151) of the trough (150) in the second slip washer (140) as indicated by the dashed line (182). When the ball bearings (122) are located within the lowest point (156) of the sections (151) of the trough (150), the tops of the ball bearings (122), which are adjacent to the washer (114), are flush with the surface of the flat bottom (108) of the driving gear (16) facing the washer (114). The ball bearings (122) locate in the lowest points (156) due to the biasing force of the belleville washer (116) which is biasing the washer (114) in a downward direction which in turn pushes the ball bearings (122) to their lowest positions.

Formed through the length of the spindle (100) is a tubular passageway (186). Located within the lower section of the tubular passageway (186) is a rod (188). The rod projects below the spindle (100) beyond the spindle (100). A seal (189) is attached to the base of the spindle (100) and surrounds the rod (188). The seal (189) prevents the ingress of dirt.

Rigidly attached to the upper end of the rod (188) a sleeve (190). Projecting in opposite directions perpendicularly to the sleeve (190) are two pegs (192). The sleeve (190) located within the spindle (100) in a position along the length of the spindle (100) where the sleeve (190) and pegs (192) are surrounded by the circular clip (160). Two vertical slots (194) are formed in the sides of the circular clip (160). The top end of the slots (194) extends to the top of the circular clip (160). The bottoms of the slots (194) extends part way down the circular clip (160), terminating in a base. In each of the slots (194) is located one of the pegs (192). The pegs (192) extend through the slots (194, 127) on the spindle (100) and the circular clip (160). The rod (188), together with the sleeve (140) and two pegs (192) can vertically slide up and down. The lowest position is where the two pegs (192) abut the bottom of the slots (194) of the circular clip (160), further downward movement being prevented by the base of the slots (194) in the circular clip as shown in FIG. 14. The highest position is where the two pegs (192) locate within the rectangular slot (146) within the second slip washer (140) in addition to being located within the top end of the slot (160), further upward movement being prevented by the underside of the first slip washer (124). A spring (196) locates between the top of the spindle (100) and the sleeve (190) in the upper section of the tubular passageway (186). The spring biases (196) the sleeve (190), two pegs (192) and rod (188) towards their lowest position. Regardless of whether the pegs (192) are at their upper or lower position, rotation of the pegs (192), results in rotation of the circular clip (160) due to the pegs (192) being located in the slots (194) which in turn results in rotation of the spindle (100).

Movement of the rod (188) between its lowest and highest position changes the clutch (18) from a low torque to a high torque clutch. The mechanism by which the rod is moved vertically is described below. The clutch operates by transferring the rotary movement from the driving gear (16) to the bevel gear (20) which is integral with the spindle (100). When the torque across the clutch (18) is below a predetermined value the driving gear (16) will rotatingly drive the bevel gear (20). When the torque across the clutch is above a predetermined value, the driving gear (16) will rotate but the bevel gear (20) will remain stationary, the clutch (18) slipping as the driving gear (16) rotates. The predetermined value of the torque at which the clutch (18) slips can be alternated between two preset values by the sliding movement of the rod (188) between the lowest and highest positions.

The mechanism by which the clutch (18) works will now be described.

Low Torque Operation

The rod (188) is located in its lowest position when the clutch (18) is acting as a low torque clutch. When in this position, the pegs (192) are disengaged from the rectangular aperture (146) in the second slip washer (140). As such, therefore, the second slip washer (140) can freely rotate about the spindle (100). As such no rotary movement can be transferred between the second slip washer (140) and the spindle (100). Therefore, all rotary movement between the driving gear (16) and the bevel gear (20) is transferred via the first slip washer (124) only.

The electric motor (2) rotatingly drives the driving gear (16) via the main driving gear (12). The driving gear (16) can freely rotate about the spindle (100). As such, no rotary movement can be transferred to the spindle (100) directly from the driving gear (16). As the driving gear rotates, the ball bearings (122) located within the innermost set of holes (118) formed within the driving gear (16) also rotate with the driving gear (16). Under normal circumstances when the rotary movement is being transferred, the ball bearings (122) are held in the lowest point (134) of the section (128) of the trough (126) formed in the first slip washer (124) by the washer (114) which is biased downwardly by the biasing force of the belleville washer (116). The direction of rotation is such that the ball bearings (122) are pushed against the ramps (134) of the trough (126), the ball bearings (122) being prevented from riding up the ramps (134) by the biasing force of the belleville washer (116). As such, when the ball bearings in the innermost set (118) rotate, the ramps (134) and hence the first slip washer (124) also rotate. As the first slip washer (124) is non-rotatably mounted on the spindle (100) due to the splines (125) engaging the slot (127) in the spindle (100), as the first slip washer (126) rotates, so does the spindle (100) and hence the bevel gear (20). As such the rotary movement is transferred from the driving gear (16) to the bevel gear (22) via the ball bearings (122) in the innermost set of holes (118), the ramps (134) and the first slip washer (124).

However, when a torque is applied to the clutch (18) (in the form of a resistance to the turning movement of the bevel gear (22)) above a certain amount, the amount of the force required to be transferred to from the ball bearings (122) to the ramps (134) on the first slip washer (124) is greater than the force exerted by the belleville (116) on the ball bearings (122) keeping them in the lowest point (129) of the section (128) of the trough (126). Therefore, the ball bearings (122) ride over the ramps (134) and then continue down the slope of the next section (128) until it engages the next ramp (134). If the torque is still greater than the predetermined amount the process is repeated, the ball bearing (122) riding up the ramps (134) against the biasing force of the belleville washer (116)

and then rolling across the next section. As this happens the first slip washer (124) remains stationary and hence the spindle (100) and bevel gear (22) also remain stationary. Therefore, the rotary movement of the driving gear (16) is not transferred to the bevel gear (22).

Though the second slip washer (140) plays no part in transferring the rotary movement of the driving gear (16) to the spindle (100) in the low torque setting, it is nevertheless rotated by the driving gear (16).

High Torque Operation

The rod (188) is located in its highest position when the clutch (18) is acting as a high torque clutch. When in this position, the pegs (192) are engaged with the rectangular aperture (146) in the second slip washer (124). As such, the second slip washer (124) is rotatably fixed to the spindle (100) via the pegs (192) located in the rectangular slot (146), the slots (194,127) of the circular clip (160) and spindle (100). As such rotary movement can be transferred between the second slip washer (140) and the spindle (100). Therefore, rotary movement between the driving gear (16) and the bevel gear (22) can be transferred via the first slip washer (124) and/or the second slip washer (140).

The mechanism by which the driving gear (16) transfers its rotary motion to the first slip washer (124) via the ball bearings (122) and ramps (134) is the same as that for the second slip washer (140).

The electric motor (2) rotatingly drives the driving gear (16) via the main driving gear (12). The driving gear (16) can freely rotate about the spindle (100). As such, no rotary movement can be transferred to the spindle (100) directly from the driving gear (16). As the driving gear (16) rotates, the ball bearings (122) located within the innermost (118) and outermost (120) set of holes formed within the driving gear (16) also rotate with the driving gear (16). Under normal circumstances when the rotary movement is being transferred, the ball bearings (122) are held in the lowest point (129, 152) of the sections (128, 151) of the troughs (126, 150) formed in both the first slip washer (126) and the second slip washer (140) by the washer (114) which is biased downwardly by the biasing force of the belleville washer (116). The direction of rotation is such that the ball bearings (122) are pushed against the ramps (134, 156) of the troughs (126, 150) of both the first slip washer (124) and the second slip washer (140), the ball bearings (122) being prevented from riding up the ramps (134, 156) by the biasing force of the belleville washer (116). As such, when the ball bearings (122) rotate, the ramps (134, 156) and hence the first and second slip washers (124, 140) also rotate. As both the first and second slip washers (124, 140) are non-rotatably mounted on the spindle (100), as the first and second slip washers rotate (124, 140), so does the spindle (100) and hence the bevel gear (22). As such the rotary movement is transferred from the driving gear (16) to the bevel gear (22) via the ball bearings (122) in the inner and outermost set of holes (118, 120), the ramps (134, 156) and the first and second slip washers (124, 140).

However, when a torque is applied to the clutch (18) (in the form of a resistance to the turn movement of the bevel gear (22)) above a certain amount, the amount of the force required to be transferred to from the ball bearings (122) to the ramps (134, 156) is greater than the force exerted by the belleville washer (116) on the ball bearings (122) keeping it in the lowest points (129, 152) of the sections of the troughs. The amount of torque required in the high torque setting is higher than that in the low torque setting. This is due to the size of the ramps (156) between sections (151) of the trough (150) in the second slip washer (140) being greater than the size of the ramps (134) between sections (128) of the trough (126) in the first slip washer (124) requiring the belleville washer (116) to be compressed to a greater extent and hence requires force for it to be done so. Therefore, when the force exceeds this greater value, the ball bearings (122) ride over the ramps (134, 156) and then continue down the slope of the next section until they engage the next ramp (134, 156). If the torque is still greater than the predetermined value the process is repeated, the ball bearings (122) riding up the ramps (134, 156) against the biasing force of the belleville washer (116) and then rolling across the next section. As this happens the first and second slip washers (124, 140) remain stationary and hence the spindle (100) and bevel gear (22) also remain stationary. Therefore, the rotary movement of the driving gear (16) is not transferred to the bevel gear (22).

Torque Change Mechanism

The mechanism by which the torque setting of the clutch (18) is adjusted will now be described.

Referring to FIGS. 14 and 18, the underside of the two torque clutch (18) is enclosed within a clutch housing (200). The rod (188) projects through the base of the housing (200). The lowest end of the rod engages with a cam (202). The cam (202) is mounted on a shaft (204) which can pivot about its longitudinal axis (206). The rod (186) and hence the cam (200) are biased towards their lowest position by the spring (196) within the spindle (100) of the clutch (18). Pivotal movement of the shaft (204) results in a pivotal movement of the cam (202) which causes the end of the rod (188) slidably engaged with the cam (202) to ride up the cam (202) causing the rod (188) to slide vertically upwards against the biasing force of the spring (196) changing the clutch (18) from the low torque to high torque setting.

Attached to shaft (204) is a flexible lever (208). Attached to the end of the flexible lever (208) is the cable (210) of a bowden cable (212). The pulling movement of the cable (210) pulls the lever (208) causing it and the shaft (204) to rotate about the axis (206). This results in the cam (202) pivoting which in turn moves the rod (188) vertically upwards. Release of the cable (210) allows the lever (208) and shaft (204) to pivot, allowing the cam (202) to move to its lowest position due to the biasing force of the spring (196) via the rod (188). The flexible lever (208), is sufficiently stiff to be able to move the shaft (204) and hence the cam (202) to change the torque setting of the clutch (18). However, if the two pegs (192) are not aligned with rectangular aperture (146) on the second slip washer (140), the pegs (192) and hence the rod (188) is prevented from travelling to their uppermost position. However, the means by which the cable (210) is pulled will not be able to discern this. Therefore, in this situation, the lever (208) bends allowing the pegs (192) to abut the underside of the second slip washer (140) whilst allowing the cable (210) to be pulled by its maximum amount. When the motor (2) is energised, the second slip washer (140) will rotate, aligning the pegs (192) with the rectangular hole (146), at which point the pegs (192) enter the rectangular hole (146) due to the biasing force of the bent lever (208).

Referring to FIGS. 18 and 19, the bowden cable (212) wraps around the external wall (214) of the motor (2) to the rear of the body (8) of the hammer. Mounted at the rear of the body (8) facing the rear handle (10) (see FIG. 14) is a pivotal finger grip (216) which is capable of pivoting about a vertical axis (218). The cable (210) of the bowden cable (212) is attached to the pivoted finger grip (216). The sleeve of the bowden cable (212) is fixed at both ends to the housing (8). Thus pivotal movement of the finger grip (216) pulls the cable (210) through the sleeve thus pulling the lever (208). The spring (196) in the clutch pulls the cable (210) via the rod (188), the cam (202) and lever (208) which in turn pulls the pivotal finger grip (216) to a first position. The finger grip (216) can be pushed to a second position against the biasing force of the spring as it pulls the cable (210) of the bowden cable. Thus pivotal movement of the finger grip (216) moves the clutch (18) from the low torque position to the high torque setting. Release of the finger grip (216) when located in the second position (clutch 18 is the high torque position) allows it to travel to its first position due to the biasing force of the spring (196) as it pushes the rod (188) and hence cam (202) downwardly.

The latch mechanism for the finger grip (216) in the high torque position will now be described.

Mounted below the finger grip (216) is a vertical lever (220). The vertical lever is mounted on the body (8) of the hammer via a horizontal shaft (222). The shaft (222), and hence the vertical lever (220), can pivot about a horizontal axis (224) from a first position where the vertical lever (220) is vertical to a second position where the top vertical of lever (220) points away from inside the body (8) towards the rear handle (10).

Referring to FIG. 20, formed on the top end of the vertical shaft (220) is a hump (226). Mounted below the finger grip (216) is a leaf spring (228) which is suspended across two arms (230) which project horizontally. When the finger grip (216) is pivoted about the vertical axis (218), the two arms (230) move in a direction indicated by Arrow E in FIG. 20. The leaf spring (228) has a link (232) formed within it which projects downwardly.

When the vertical lever (220) is in its normal operating position it is vertical. When the finger grip (216) is in its first position when the clutch (18) is in its low torque setting, the leaf spring (228) is to the left of the lever (220) when viewed in FIG. 20.

When the clutch (18) is to be moved to the high torque setting, the finger grip (216) is pivoted about the vertical axis (218), the leaf spring moving towards the top of the lever (220). As it does so, a first side (234) of the link (232) engages with the first side (236) of the hump (226) on the top of the lever (220). As the finger grip (216) continues to pivot, the leaf spring (228) flexes, the link (232) moving upwardly and over the hump (226) and then reverts to original shape with a second side (237) of the link (232) engaging the second side (238) of the hump (226), as shown in FIG. 20.

The biasing force of the spring (196) in the clutch pulls the finger grip (216) in the direction of Arrow F in FIG. 20. However, the force of the spring (196) is insufficient to pull the leaf spring lock over the hump (226).

To move the clutch (18) from a high torque setting to a low torque setting, the operator pushes the finger grip (216) forcing the leaf spring (228) to ride back over the hump (226) after which the spring in the clutch pulls the finger grip (216) to a position where the clutch is in a low torque setting.

It is desired to ensure that the two torque clutch reverts to the low torque setting when the electrical power is applied to the hammer forcing the operator to consciously move the clutch (18) to a high torque setting when required.

Furthermore, it is desired to prevent operation of the hammer when the finger grip has been moved to the low torque setting but the clutch remains in the high torque setting.

Referring to FIGS. 19 and 21, attached to the lower end of the vertical lever (220) is a solenoid (250). The solenoid comprises a coil of wire (252) and a magnetic pin (254). A spring (256) is attached between the casing (258) of the coil (252) and the pin (254) and biases the pin (254) into the coil (252). One end (260) of the pin (254) is attached to the lower end of the vertical lever (220). The longitudinal axis of the pin (254) is horizontal.

When the solenoid is not activated by an electric current, the pin (254) is moved to an inward position by the force of the spring (256). This moves the end of the vertical lever (220) causing the lever (220) to pivot to a position where the vertical lever (220) is vertical. In this position, the leaf spring (228) mounted below the finger, grip (216) can engage the hump (226) on the top end of the lever (220).

When the solenoid is activated by an electric current, the pin (254) is pulled into the coil (252) causing it to pull the lower end of the lever which in turn causes the lever (220) to pivot about the axis (224) resulting in the top end of the lever (220) with the hump (226) pivoting away from the leaf spring (228) mounted below the finger grip (216) (pivoting out of the page as shown in FIG. 20). If the finger grip (216) is being held in its second position so that the clutch is in the high torque setting, by the leaf spring (228) being held by the hump, activation of the solenoid (250) then pivots the lever and disengages the hump (226) from the leaf spring (228). This allows the finger grip (216) to return to its first position and hence allow the clutch (18) to move to a low torque setting due to the biasing force of the spring (196) on the clutch.

A sensor (not shown) is mounted on the flexible lever (208) and detects the position of the end of the lever (208). A sensor (not shown) is mounted on the finger grip (216) and detects the position of the finger grip (216). A sensor is mounted within the trigger switch and detects whether a current is applied to the hammer. A circuit monitors the three sensors and based on a number of predetermined conditions activates the solenoid (150), as shown in more detail in FIG. 22.

In normal operation the solenoid is not activated.

If no current is being supplied to the hammer (i.e. it is unplugged), the circuit monitors when a current is supplied to operate the hammer (i.e. the hammer is plugged in).

When the circuit detects the current, it checks that the two sensors on the flexible lever (208) and the finger grip (216) both indicate that the clutch (18) is in the low torque setting. If they are, the circuit does nothing. If they are not or one of them is not, it activates the solenoid ensuring that the finger grip can return to its lowest position. Once the two sensors both indicate that the torque clutch is in the low torque setting, the circuit switches the solenoid off, allowing the finger grip to function as normal.

The circuit further constantly monitors the two sensors on the flexible lever (208) and the finger grip (216). If the sensor on the finger grip (216) indicates it is the first setting but the sensor on the flexible lever (208) indicates the clutch is in the high torque setting, it deactivates the hammer, preventing use until the clutch is reset.

The sensor is placed on the flexible lever (208) rather than the clutch (18), because, if the pegs (192) are not aligned with the rectangular hole (146) in the second slip washer (140), the sensor may indicate that the clutch is in the low torque setting whereas the flexible lever (208) may be biasing it into a high torque setting and, when the hammer is operated, would move the clutch (18) into the high torque setting.

It will be appreciated by persons skilled in the art that the above embodiments have been described by way of example only, and not in any limitative sense, and that various alterations and modifications are possible without departure from the scope of the invention as defined by the appended claims. For example, it will be appreciated that the two-torque clutch (18) described with reference to FIGS. 13 to 17 may have more than two torque settings.

The invention claimed is:

1. A power tool comprising:
a motor;
a tool holder for holding an output member;

a transmission for transmitting rotary torque from the motor to the tool holder, the transmission comprising a first transmission portion and a second transmission portion and a clutch assembly located between the first transmission portion and the second transmission portion; the clutch assembly comprising:

a clutch shaft;

an output gear for driving the second transmission portion with rotary torque transmitted across the clutch assembly, the output gear rotationally fixed relative to the clutch shaft;

an input gear for receiving rotary torque from the first transmission portion, the input gear located around and rotatable relative to the clutch shaft;

a first slip disc and a first clutch mechanism operable for transmitting rotary torque not exceeding a first predetermined torque limit from the input gear to the clutch shaft;

a second slip disc and a second clutch mechanism operable for transmitting rotary torque not exceeding a second predetermined torque limit from the input gear to the clutch shaft, the second predetermined torque limit being greater than the first predetermined torque limit;

an actuator mechanism for selectively engaging the second slip disc for transmitting rotary torque, not exceeding the second predetermined torque limit, from the input gear to the clutch shaft.

2. A power tool according to claim 1 wherein:

the first slip disc surrounds the clutch shaft and is nonrotatable and axially slidable relative to the clutch shaft;

the second slip disc surrounds and is rotatable relative to the clutch shaft; and the actuator mechanism is movable to a position where it locks the second slip disc in rotation with the clutch shaft.

3. A power tool according to claim 2 wherein the first clutch mechanism comprises:

a first plurality of holes in the input gear;

a first plurality of balls locatable in the first plurality of holes;

a first trough on a first side of the first slip disc, the first trough including a first series of recesses and ramps.

4. A power tool according to claim 3 wherein the second clutch mechanism comprises:

a second plurality of holes in the input gear;

a second plurality of balls locatable in the second plurality of holes;

a second trough on a first side of the second slip disc, the second trough including a second series of recesses and ramps.

5. A power tool according to claim 4 wherein the first clutch mechanism and the second clutch mechanism are biased into a torque transmitting arrangement by a single spring.

* * * * *